United States Patent
Barbarossa et al.

(10) Patent No.: US 6,392,807 B1
(45) Date of Patent: May 21, 2002

(54) TUNABLE CHROMATIC DISPERSION COMPENSATOR UTILIZING A VIRTUALLY IMAGED PHASED ARRAY AND FOLDED LIGHT PATHS

(75) Inventors: Giovanni Barbarossa, Santa Clara; Jialing Yang, Fremont, both of CA (US)

(73) Assignee: Avanex Corporation, Fremont, CA (US)

( * ) Notice: Subject to any disclaimer, the term of this patent is extended or adjusted under 35 U.S.C. 154(b) by 0 days.

(21) Appl. No.: 09/746,261

(22) Filed: Dec. 22, 2000

(51) Int. Cl.[7] .............................................. G02B 27/00
(52) U.S. Cl. ....................... 359/578; 359/577; 359/615; 359/161
(58) Field of Search ................................ 359/577, 615, 359/161, 578; 372/25

(56) References Cited

U.S. PATENT DOCUMENTS

| | | | |
|---|---|---|---|
| 4,750,809 A | * 6/1988 | Kafka et al. | 359/615 |
| 4,834,474 A | * 5/1989 | George et al. | 372/25 |
| 5,166,818 A | * 11/1992 | Chase et al. | 359/615 |
| 5,329,398 A | * 7/1994 | Lai et al. | 359/615 |
| 5,349,591 A | * 9/1994 | Weston et al. | 372/25 |
| 5,930,045 A | 7/1999 | Shirasaki | 359/577 |

FOREIGN PATENT DOCUMENTS

JP          11-223745    * 8/1999

* cited by examiner

Primary Examiner—Cassandra Spyrou
Assistant Examiner—John Juba, Jr.
(74) Attorney, Agent, or Firm—Sawyer Law Group LLP

(57) ABSTRACT

The present invention provides an improved tunable chromatic dispersion compensator. The compensator includes: a virtually imaged phased array (VIPA); at least one reflector optically coupled to the VIPA; a mirror optically coupled to the at least one reflector; and a movable reflector holder coupled to the at least one reflector, where the movable reflector holder moves the at least one reflector such that a length of a beam path between the VIPA and the at least one reflector and the mirror is variable. The present invention uses the VIPA to produce a controlled variable degree of chromatic dispersion within a plurality of optical channels so as to compensate for unwanted chromatic dispersion in an optical communications system. Positional adjustment of the movable reflector holder permits variable control of the beam path length between the VIPA and the focusing lens. This variable change in beam path length permits variable control of the magnitude and sign of chromatic dispersion provide by the compensator.

22 Claims, 18 Drawing Sheets

TUNABLE CHROMATIC DISPERSION COMPENSATOR UTILIZING A VIRTUALLY IMAGED PHASED ARRAY AND FOLDED LIGHT PATHS

FIELD OF THE INVENTION

The present invention relates to chromatic dispersion in optical networks, and more particularly to compensating for chromatic dispersion in optical networks.

BACKGROUND OF THE INVENTION

Fiber optic networks are becoming increasingly popular for data transmission because of their high speed and high data capacity capabilities. Wavelength division multiplexing is used in such fiber optic communication systems to transfer a relatively large amount of data at a high speed. In wavelength division multiplexing, multiple information-carrying signals, each signal comprising light of a specific restricted wavelength range, may be transmitted along the same optical fiber.

In this document, these individual information-carrying lights are referred to as either "signals" or "channels." The totality of multiple combined signals in a wavelength-division multiplexed optical fiber, optical line or optical system, wherein each signal is of a different wavelength range, is herein referred to as a "composite optical signal."

One common and well-known problem in the transmission of optical signals is chromatic dispersion of the optical signal. Chromatic dispersion refers to the effect wherein the lights of different wavelengths comprising an optical channel travel through an optic fiber at different speeds. For optical fiber, chromatic dispersion is defined by the quantity D (ps-km$^{-1}$-nm$^{-1}$) through the relationship of Eqn. 1

$$D = \frac{d}{d\lambda}\left(\frac{1}{v_g}\right) = \frac{1}{L}\left(\frac{d\tau_g}{d\lambda}\right) \quad \text{Eqn. (1)}$$

In the above eqn. 1, the quantity $\lambda$ is the physical wavelength of signal light (nm), $v_g$ is the group velocity (km/ps) of the signal light at the wavelength $\lambda$, L is the fiber length (km) and $\tau_g$ is the delay time (ps) required for light of wavelength $\lambda$ to propagate the distance L. If $v_g$ decreases with increasing wavelength (i.e., longer or "red" wavelengths travel slower than relatively shorter or "blue" wavelengths) then D is positive, otherwise D is negative. The quantity D is an intrinsic property of each fiber type and may vary with wavelength. The related quantities $D_f$ and $D_c$ are herein defined by Eqn. (2)

$$D_f = LD = \left(\frac{d\tau_g}{d\lambda}\right) = -D_c \quad \text{Eqn. (2)}$$

wherein $D_f$ is the time delay, per unit change in wavelength, produced by a length L of fiber and $D_c$ is the opposite time delay, per unit change in wavelength, which must be produced by a dispersion compensator so as to exactly compensate for the fiber's chromatic dispersion.

The problem of chromatic dispersion becomes more acute for data transmission speeds higher than 2.5 gigabytes per second. The resulting pulses of the signal will be stretched, will possibly overlap, and will cause increased difficulty for optical receivers to distinguish where one pulse begins and another ends. This effect seriously compromises the integrity of the signal. Therefore, for a fiber optic communication system to provide a high transmission capacity, the system must compensate for chromatic dispersion. The exact value of the chromatic dispersion produced in a channel of a wavelength-division multiplexed fiber optic communications system depends upon several factors, including the type of fiber and the wavelength of the channel.

Accordingly, there exists a need for a tunable chromatic dispersion compensator. The present invention addresses such a need.

SUMMARY OF THE INVENTION

The present invention provides an improved tunable chromatic dispersion compensator. The compensator includes: a virtually imaged phased array (VIPA); at least one reflector optically coupled to the VIPA; a mirror optically coupled to the at least one reflector; and a movable reflector holder coupled to the at least one reflector, where the movable reflector holder moves the at least one reflector such that a length of a beam path between the VIPA and the at least one reflector and the mirror is variable. The present invention uses the VIPA to produce a controlled variable degree of chromatic dispersion within a plurality of optical channels so as to compensate for unwanted chromatic dispersion in an optical communications system. Positional adjustment of the movable reflector holder permits variable control of the beam path length between the VIPA and the focusing lens. This variable change in beam path length permits variable control of the magnitude and sign of chromatic dispersion provide by the compensator.

DETAILED DESCRIPTION

The present invention provides an improved tunable chromatic dispersion compensator. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 1 through 12 in conjunction with the discussion below.

Figure 1:
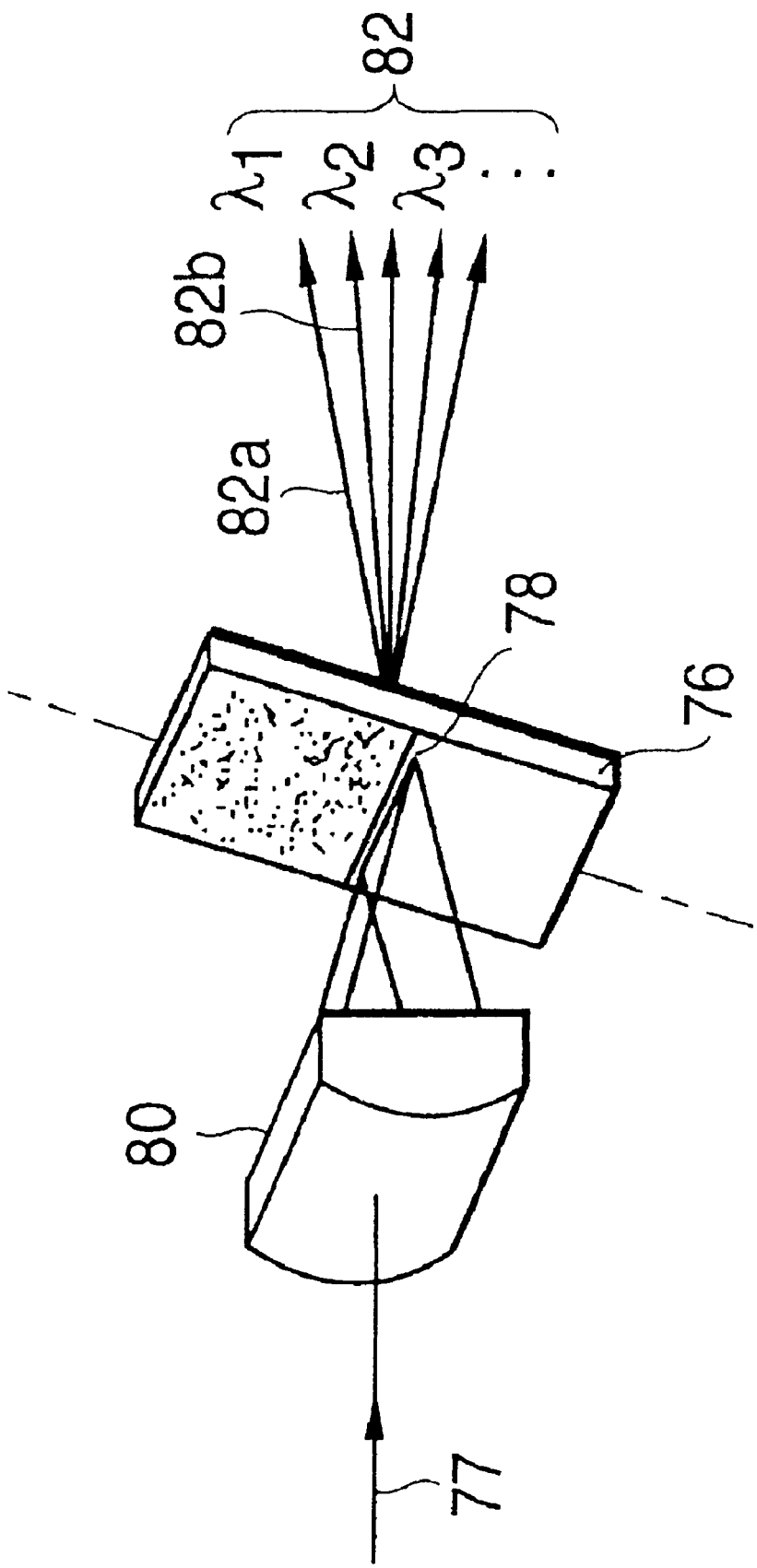
FIG. 1 is a diagram illustrating a virtually imaged phased array (VIPA) that comprises a component of tunable chromatic dispersion compensator in accordance with the present invention.

FIG. 1 is a diagram illustrating a virtually imaged phased array that comprises a component of tunable chromatic dispersion compensator in accordance with the present invention. Hereinafter, the terms "virtually imaged phased array" and "VIPA" may be used interchangeably. The VIPA is disclosed in U.S. Pat. No. 5,930,045, incorporated herein by reference.

Referring now to FIG. 1, a VIPA 76 is preferably made of a thin plate of glass. An input light 77 is focused into a line 78 with a lens 80, such as a cylindrical lens or semicylindrical lens, so that input light 77 travels into VIPA 76. Line 78 is hereinafter referred to as "focal line 78". Input light 77 radially propagates from focal line 78 to be received inside VIPA 76. The VIPA 76 then outputs a luminous flux 82 of collimated light, where the output angle of luminous flux 82 varies as the wavelength of input light 77 changes. For example, when input light 77 is at a wavelength $\lambda_1$, VIPA 76 outputs a luminous flux 82a at wavelength $\lambda_1$ in a specific direction. When input light 77 is at a wavelength $\lambda_2$, VIPA 76 outputs a luminous flux 82b at wavelength $\lambda_2$ in a different direction. Therefore, VIPA 76 produces luminous fluxes 82a and 82b that are spatially distinguishable from each other.

Figure 2:
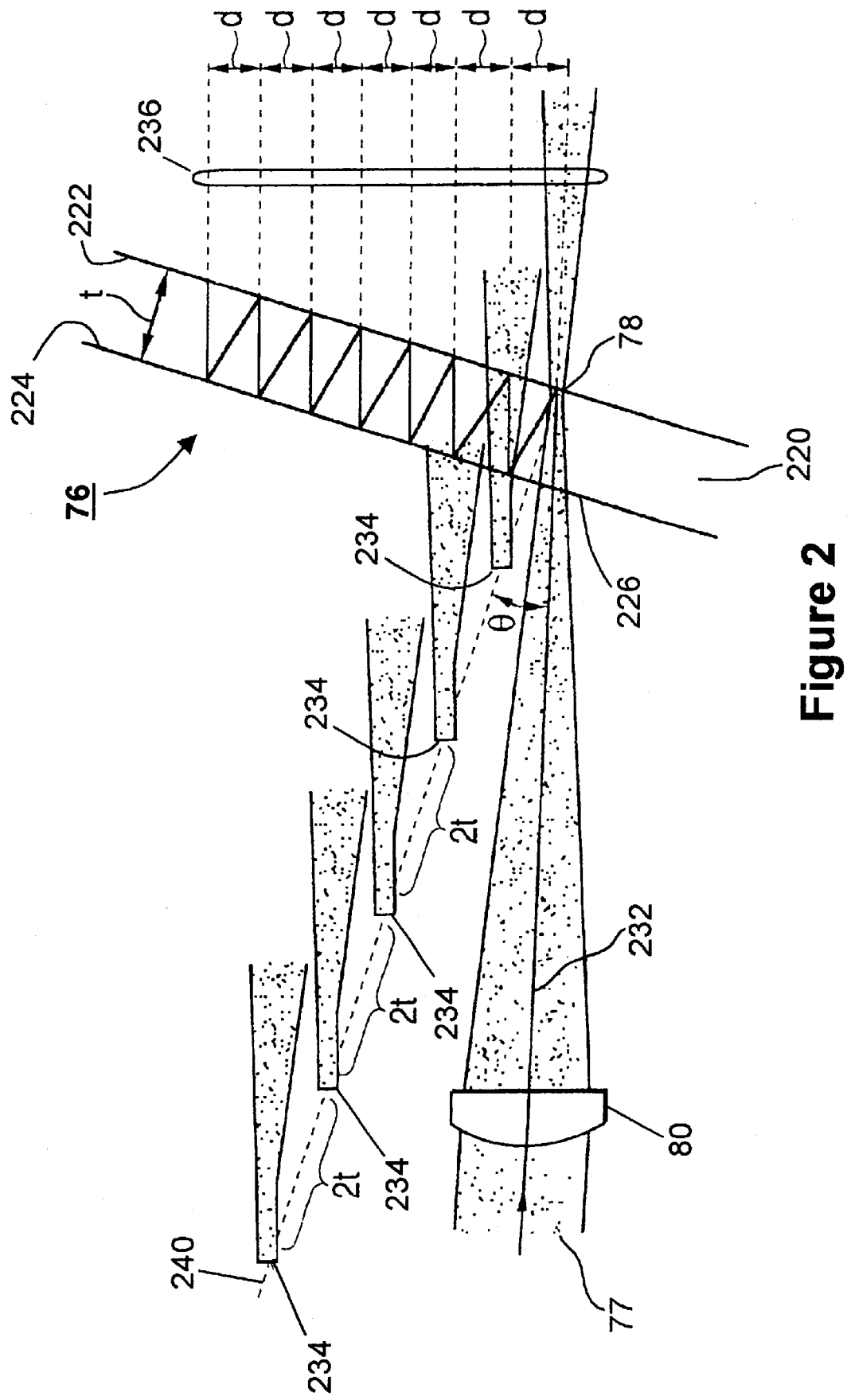
FIG. 2 is a detailed diagram illustrating the VIPA of FIG. 1 and the light path therein and therethrough.

FIG. 2 is a detailed diagram illustrating VIPA 76 and light paths therein and therethrough. Referring now to FIG. 2, VIPA 76 includes a plate 220 made of, for example, glass, and having reflecting films 222 and 224 thereon. Reflecting film 222 preferably has a reflectance of approximately 95% or higher, but less than 100%. Reflecting film 224 preferably has a reflectance of approximately 100%. A radiation window 226 is formed on plate 220 and preferably has a reflectance of approximately 0% reflectance.

Input light 77 is focused into focal line 78 by lens 80 through radiation window 226, to subsequently undergo multiple reflection between reflecting films 222 and 224. Focal line 78 is preferably on the surface of plate 220 to which reflecting film 222 is applied. Thus, focal line 78 is essentially line focused onto reflecting film 222 through radiation window 226. The width of focal line 78 can be referred to as the "beam waist" of input light 77 as focused by lens 80. Thus, the VIPA illustrated in FIG. 2 focuses the beam waist of input light 77 onto the far surface (that is, the surface having reflecting film 222 thereon) of plate 220. By focusing the beam waist on the far surface of plate 220, the VIPA reduces the possibility of overlap between (i) the area of radiation window 226 on the surface of plate 220 covered by input light 77 as it travels through radiation window 226 and (ii) the area on reflecting film 224 covered by input light 77 when input light 77 is reflected for the first time by reflecting film 224. It is desirable to reduce such overlap to ensure proper operation of the VIPA.

In FIG. 2, an optical axis 232 of input light 77 has a small tilt angle θ with respect to a line 240 perpendicular to the plane of plate 220. Upon the first reflection off of reflecting film 222, 5% of the light passes through reflecting film 222 and diverges after the beam waist 78, and 95% of the light is reflected towards reflecting film 224. After being reflected by reflecting film 224 for the first time, the light again hits reflecting film 222 but is displaced by an amount d. Then, 5% of the light passes through reflecting film 222. In a similar manner, as illustrated in FIG. 2, the light is split into many paths with a constant separation d. The beam shape in each path forms so that the light diverges from virtual images 234 of the beam waist. Virtual images 234 are located with constant spacing 2 t along a line 240 that is normal to plate 220, where t is the thickness of plate 220. The positions of the beam waists in virtual images 234 are self-aligned, and there is no need to adjust individual positions. The lights diverging from virtual images 234 interfere with one other and form collimated light 236 that propagates in a direction that changes in accordance with the wavelength of input light 77.

The spacing of light paths is d=2 t sin θ, and the difference in the path lengths between adjacent beams is 2 t cos θ. The angular dispersion of the VIPA is proportional to the ratio of these two numbers, which is cot θ. As a result, a VIPA produces a significantly large angular dispersion.

The plate 220 has reflecting surfaces 222 and 224 thereon. Reflecting surfaces 222 and 224 are in parallel with each other and spaced by the thickness t of plate 220 and are typically reflecting films deposited on plate 220. As previously described, reflecting surface 224 has a reflectance of approximately 100%, except in radiation window 226, and reflecting surface 222 has a reflectance of approximately 95% or higher. Therefore, reflecting surface 222 has a transmittance of approximately 5% or less so that approximately 5% of less of light incident on reflecting surface 222 will be transmitted therethrough and approximately 95% or more of the light will be reflected therefrom. The reflectances of reflecting surfaces 222 and 224 can easily be changed in accordance with the specific VIPA application. However, generally, reflecting surface 222 should have a reflectance that is less than 100% so that a portion of incident light can be transmitted therethrough. This reflectance need not be constant along the reflecting film 222.

The reflecting surface 224 has radiation window 226 thereon. Radiation window 226 allows light to pass therethrough, and preferably has no reflectance, or a very low reflectance. Radiation window 226 receives input light 77 to allow input light 77 to be received between, and reflected between, reflecting surfaces 222 and 224.

A VIPA has strengthening conditions that are characteristics of the design of the VIPA. The strengthening conditions increase the interference of the output lights so that a luminous flux is formed. The strengthening conditions of the VIPA are represented by the following Equation (1):

$$2 t \cos \phi = m\lambda \qquad \text{Eqn. (3)}$$

in which φ indicates the propagation direction of the resulting luminous flux as measured from a line perpendicular to the surface of reflecting surfaces 222 and 224, λ indicates the wavelength of the input light, t indicates the distance between the reflecting surfaces 222 and 224, and m indicates an integer. Therefore, if t is constant and m is assigned a specific value, then the propagation direction φ of the luminous flux formed for input light having wavelength λ can be determined.

More specifically, input light 77 is radially dispersed from focal line 78 through a specific angle. Therefore, input light having the same wavelength will be traveling in many different directions from focal line 78, to be reflected between reflecting surfaces 222 and 224. The strengthening conditions of the VIPA cause light traveling in a specific direction to be strengthened through interference of the output lights to form a luminous flux having a direction corresponding to the wavelength of the input light. Light traveling in different direction than the specific direction required by the strengthening condition is weakened by the interference of the output lights.

Figure 3:
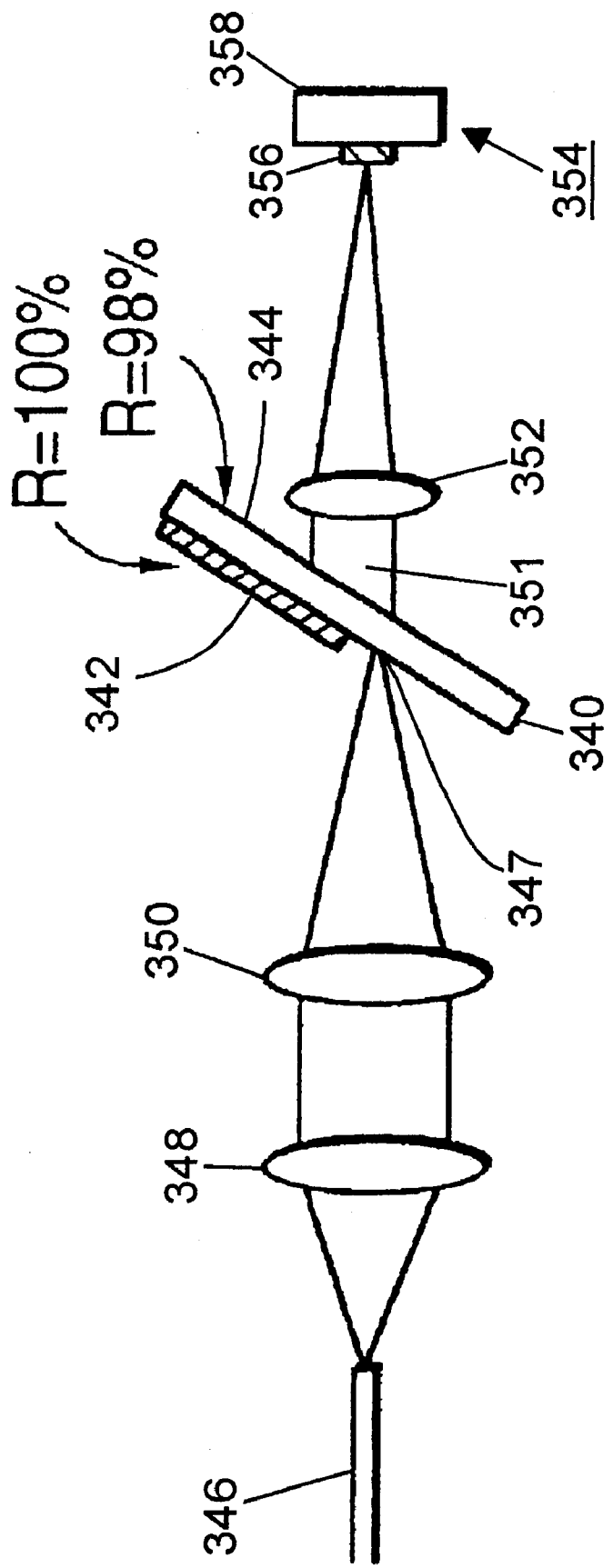
FIG. 3 is a diagram of a prior-art apparatus that uses a VIPA as an angular dispersive component to produce chromatic dispersion.

FIG. 3 is a diagram of a prior-art apparatus that uses a VIPA as an angular dispersive component to produce chromatic dispersion. As illustrated in FIG. 3, a light is output from a fiber 346, collimated by a collimating lens 348 and line-focused into VIPA 340 through radiation window 347 by a cylindrical lens or semi-cylindrical lens 350. The VIPA 340 then produces a collimated light 351 that is focused by a focusing lens 352 onto a mirror 354. Mirror 354 can be a mirror portion 356 formed on a substrate 358. Mirror 354 reflects the light back through focusing lens 352 into VIPA 340. The light then undergoes multiple reflections in VIPA 340 and is output from radiation window 347. The light output from radiation window 347 travels through cylindrical lens 350 and collimating lens 348 and is received by fiber 346.

Therefore, light is output from VIPA 340 and reflected by mirror 354 back into VIPA 340. The light reflected by mirror 354 travels through the path that is opposite in direction to the path through which it originally traveled. As described in greater detail herein following, different wavelength components in the light are focused onto different positions on mirror 354, and are reflected back to VIPA 340. As a result, different wavelength components travel different distances, to thereby produce chromatic dispersion.

Figure 4:
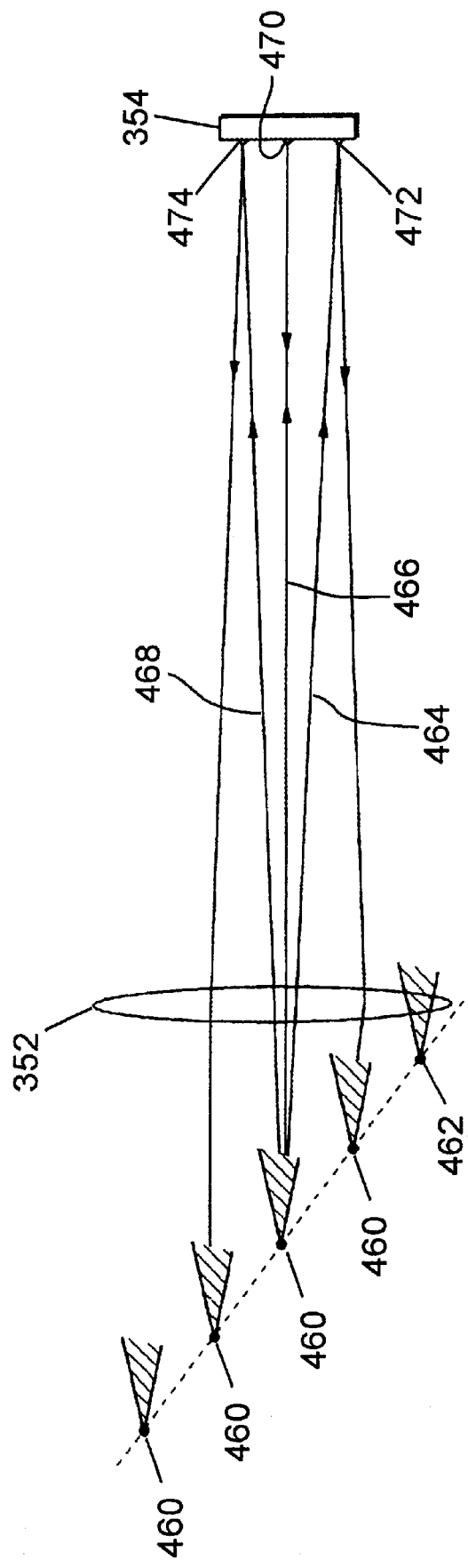
FIG. 4 is a more detailed diagram illustrating the operation of the dispersion producing VIPA in FIG. 3.

FIG. 4 is a more detailed diagram illustrating the operation of the dispersion producing VIPA 340 in FIG. 3. Assume a light having various wavelength components is received by VIPA 340. As illustrated in FIG. 4, VIPA 340 will cause the formation of virtual images 460 of beam waist 462, where each virtual image 460 "emits" light. As illustrated in FIG. 4, focusing lens 352 focuses the different wavelength components in a collimated light from VIPA 440 at different points on mirror 354. More specifically, a longer wavelength 464 focuses at point 472, a center wavelength 466 focuses at point 470, and a shorter wavelength 468 focuses at point 474. Then, longer wavelength 464 returns to a virtual image 460 that is closer to beam waist 462, as compared to center wavelength 466. Shorter wavelength 468 returns to a virtual image 460 that is farther from beam waist 462, as compared to center wavelength 466.

A wavelength division multiplexed light usually includes many channels, wherein each channel has a center wavelength and the center wavelengths are usually spaced apart by a constant frequency spacing. If the thickness t between first and second surfaces 222 and 224 of VIPA 340 is set at a specific value, the arrangement will be able to simultaneously compensate for dispersion in each channel. The thickness t which permits such simultaneous dispersion compensation is such that all of the wavelength components corresponding to the center wavelengths have the same output angle from VIPA 340 and thus the same focusing position on mirror 354. This is possible when the thickness t is set so that, for each channel, the round-trip optical length through VIPA 340 traveled by the wavelength component corresponding to the center wavelength is a multiple of the center wavelength of each channel. In other words, t is chosen such that the quantity 2 nt cos θ is an integer multiple of the center wavelength of each channel, where n is the refractive index of the plate 220. This amount of thickness t will hereafter be referred to as the "WDM matching free spectral range thickness", or "WDM matching FSR thickness".

Therefore, utilizing the configuration illustrated in FIG. 4, with the thickness t set to the WDM matching FSR thickness, VIPA 340 and focusing lens 352 will cause (a) the wavelength component corresponding to the center wavelength of each channel to be focused at point 470 on mirror 354, (b) the wavelength component corresponding to the longer wavelength component of each channel to be focused at point 472 on mirror 354, and (c) the wavelength component corresponding to the shorter wavelength component of each channel to be focused at point 474 on mirror 354. Therefore, VIPA 340 can be used to compensate for chromatic dispersion in all channels of a wavelength division multiplexed light.

Figure 5A:
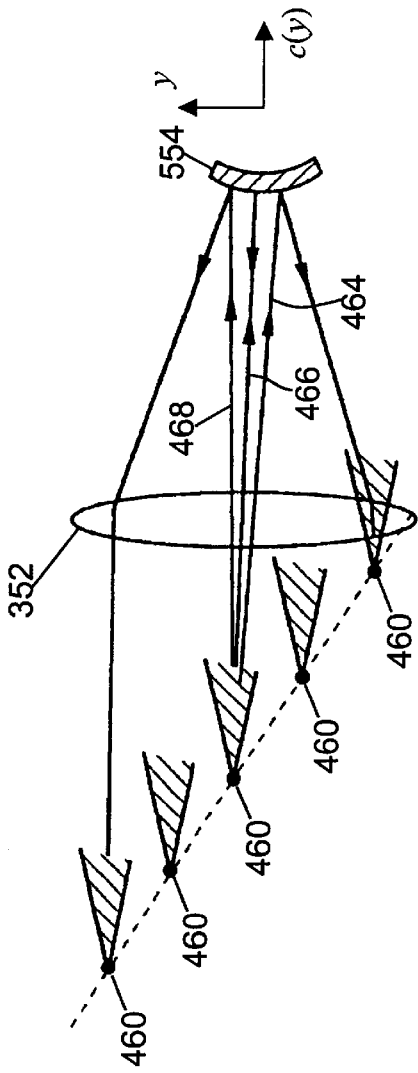
FIGS. 5a and 5b are diagrams illustrating additional embodiments of prior-art apparatuses that use a VIPA to provide various values of chromatic dispersion to light.
Figure 5B:
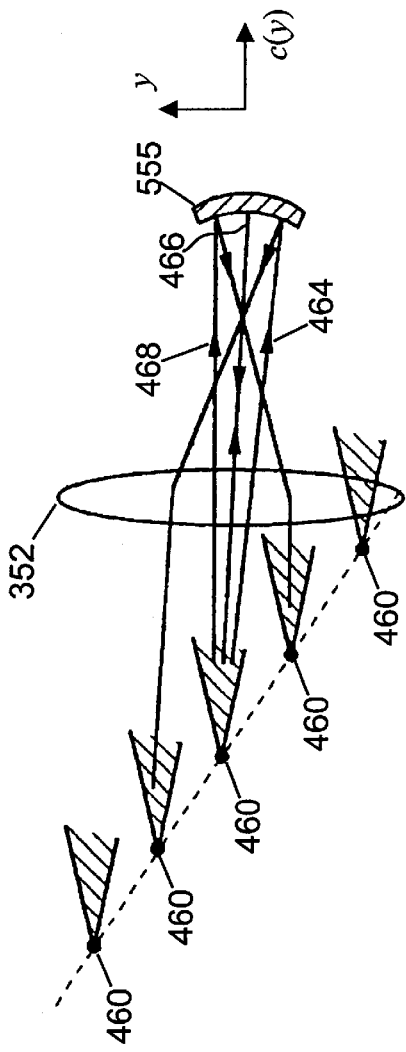

FIGS. 5a and 5b are diagrams illustrating additional embodiments of prior-art apparatuses that use a VIPA to provide various values of chromatic dispersion to light. In FIGS. 5a and 5b, there are illustrated the travel directions of a longer wavelength 464, a center wavelength 466 and a shorter wavelength 468 of light emitted by a virtual image 460 of beam waist 462. In FIGS. 5a and 5b, the mirror 554 and the mirror 555 are located at or near the focal point of focusing lens 352 and the distance between the virtual images 460 and the lens 352 is less than the focal distance, f, of lens 352. In FIG. 5a, mirror 554 is a convex mirror. With a convex mirror, the beam shift is magnified relative to that produced by a flat mirror. Therefore, a large chromatic dispersion can be obtained with a short lens focal length and a small amount of space. In FIG. 5b, mirror 555 is a concave mirror. With a concave mirror, the sign of the dispersion is inverted relative to that produced by a flat mirror.

When the distance between the virtual images 460 and the lens 352 is less than the focal distance, f, of lens 352, then, with either a flat mirror 354 (FIG. 4) or a convex mirror 554 (FIG. 5a), the light of longer ("red") wavelengths of an optical signal travels a shorter round trip distance through the apparatus then does the light of shorter ("blue") wavelengths of said signal. Thus, negative chromatic dispersion is introduced into the signal, that is, $D_c<0$. This form of apparatus is useful for compensating accumulated positive chromatic dispersion (i.e., $D_f>0$) in an optical signal. With a concave mirror 555 (FIG. 5b), the light of "red" wavelengths of an optical signal travels a greater distance through the apparatus then does the light of "blue" wavelengths of said signal. Thus, positive chromatic dispersion is introduced into the signal and $D_c>0$. This latter form of apparatus is useful for compensating accumulated negative chromatic (i.e., $D_f<0$) dispersion in an optical signal.

To quantify the shape of the mirror, a coordinate system (y, c(y)) may be established as shown in FIGS. 5a–5b. With this choice of coordinate system, then the slope h(y) of the mirror at a particular value of y is defined as $$h(y) = \frac{dc(y)}{dy}$$

and the curvature u(y) of the mirror at a particular value of y is given by $$u(y) = \frac{dh(y)}{dy} = \frac{d^2 c(y)}{dy^2}.$$

For a flat mirror, such as mirror 354 of FIG. 4, it is the case that both h(y)=0 and u(y)=0 for all values of y. For a convex mirror, such as mirror 554 of FIG. 5a, the quantity h(y) is variable and generally non-zero and the quantity u(y) is greater than zero. For a concave mirror, such as mirror 555 of FIG. 5b, the quantity h(y) is variable and generally non-zero and the quantity u(y) is less than zero.

Figure 6A:
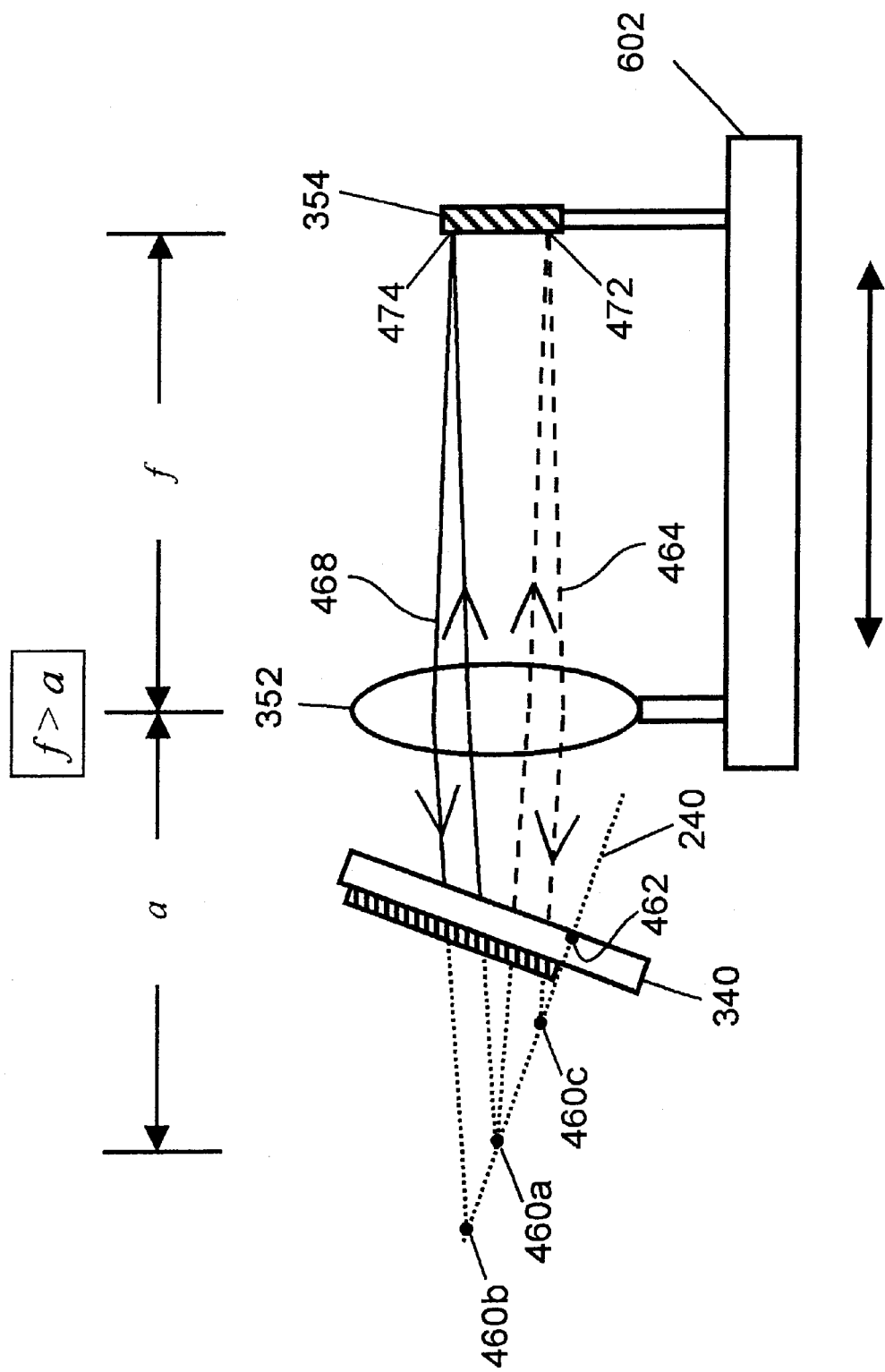
FIGS. 6a and 6b are diagrams illustrating a side view of a prior-art apparatus that uses a VIPA to chromatic dispersion.
Figure 6B:
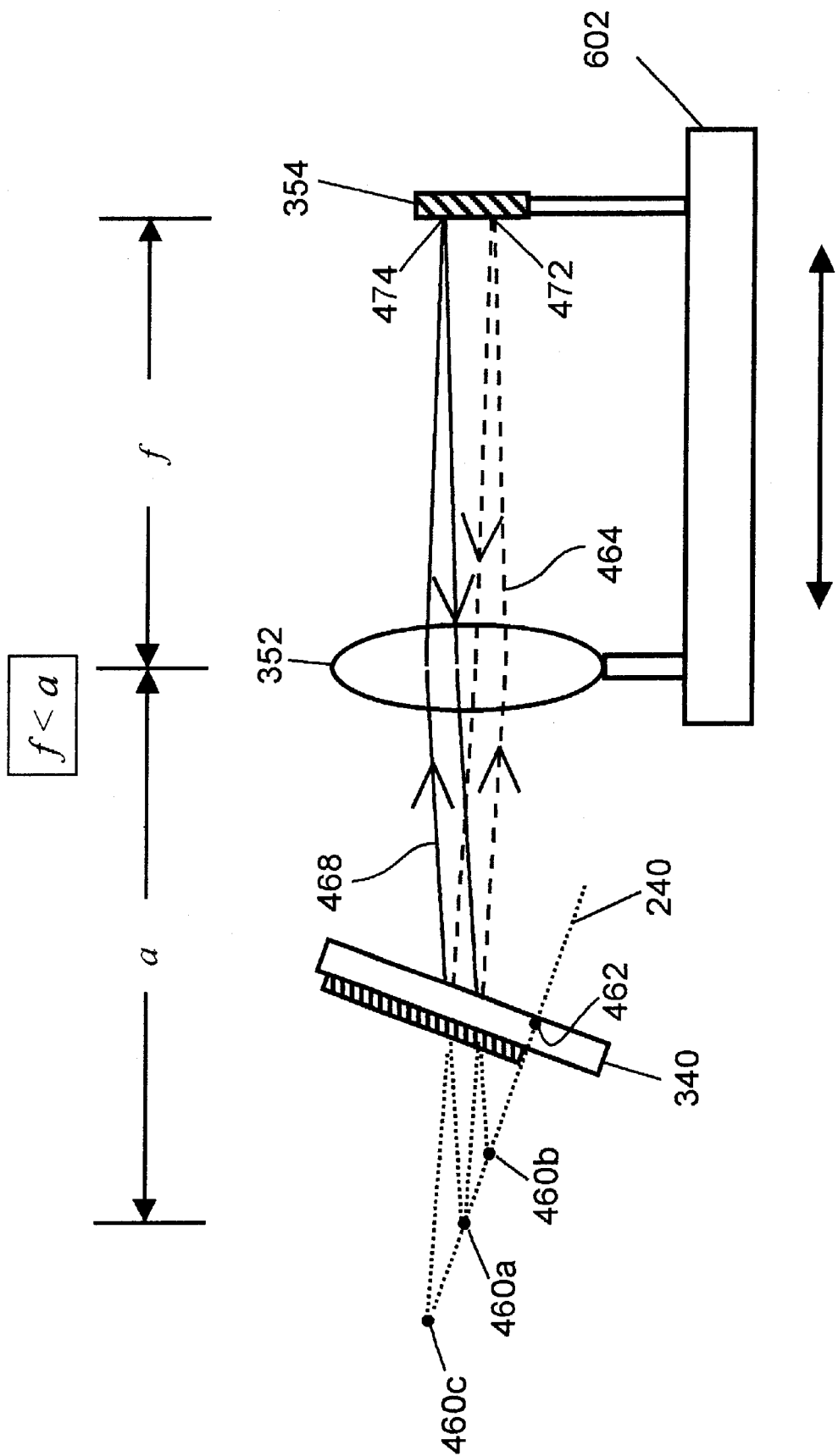

FIGS. 6a and 6b are diagrams illustrating a side view of a prior-art apparatus that uses a VIPA to provide variable chromatic dispersion. Referring now to FIGS. 6a–6b, the relative distance between the focusing lens 352 and the mirror 354 is maintained substantially at the constant value f by a mirror and lens holder 602, and the focusing lens 352 and mirror 354 are moved together relative to the VIPA 340 by movement or translation of the mirror and lens holder 602. This movement of focusing lens 352 and mirror 354 changes the shift of light returning to VIPA 340 from mirror 354 and thereby varies the magnitude of the chromatic dispersion produced by the apparatus, as shown by a comparison between FIG. 6a and FIG. 6b. In FIGS. 6a and 6b, the distance between the lens 352 and a virtual image of the beam waist is denoted as a. The input angle of light into the VIPA 340 is denoted by $\Theta$ and the output angle of signal light of wavelength $\lambda$ is denoted by $\Phi$. Both the angles $\Theta$ and $\Phi$ are measured relative to a line that is perpendicular to the parallel reflective faces of the VIPA. With these definitions, it can be shown that the wavelength-dependent delay $D_c$ is given by $$D_c \approx -\frac{2n^2}{c\lambda\Phi^3}\{(f-a)\Theta + f^2\Phi u(y) - fh(y)\} \quad \text{Eqn. (4a)}$$

in which n is the refractive index of the material comprising the plate 220 of VIPA 340, c is the speed of light in vacuum and h(y) and u(y) are the curvature and slope of the mirror at position y as defined in FIGS. 5a–5b and the discussion thereto. For a flat mirror, such as mirror 354 in FIGS. 6a–6b, Eqn. 4a reduces to $$D_c \approx -\frac{2n^4}{c\lambda\Phi^3}(f-a)\Theta \quad \text{Eqn. (4b)}$$

Equation (4b) and FIGS. 6a–6b show that, for a flat mirror, the sign of the quantity (f–a) determines the algebraic sign of the wavelength-dependent delay produced by VIPA 340. FIGS. 6a–6b illustrate the change in the sign of $D_c$ as a function of (f–a). If, as shown in FIG. 6a, the distance a is less than the lens focal length f, then light 468 comprising a relatively shorter wavelength "returns" to a virtual image 460b of beam waist 462 that is further from beam waist 462 then is the virtual image 460c, to which light 464 comprising a relatively longer wavelength "returns". In this case, negative chromatic dispersion $D_c$ is added to the signal comprising lights 464 and 468. If on the other hand, the distance a is greater than the lens focal length f, as shown in FIG. 6b, then the relative positions of points 460b and 460c with respect to point 460a are reversed and positive chromatic dispersion $D_c$ is added to the signal. The controlled variation of the magnitude and sign of $D_c$ through the adjustment of the distance (f–a) is herein referred to as tunable chromatic dispersion compensation.

FIGS. 7a–7d illustrate a first preferred embodiment of a tunable chromatic dispersion compensator in accordance with the present invention. The tunable chromatic dispersion compensator 700 utilizes a retro-reflector 706 to fold back the beam path so as to reduce the overall length while maintaining the capability for tunable chromatic dispersion compensation. The tunable dispersion compensator 700 comprises an outer housing or container 702 that supports a VIPA/lens assembly 703, a mirror/lens assembly 705 and a movable retro-reflector holder 708. The VIPA/lens assembly 703 comprises a VIPA 340 and lens holder 704 that supports a VIPA 340, an optical fiber 710, a collimating lens 348 and a cylindrical or semi-cylindrical focusing lens 350. The mirror/lens assembly 705 comprises a mirror and lens holder 602, a focusing lens 352 and a mirror 354. The mirror 354 is disposed substantially at a distance f from lens 352, where f is the focal length of lens 352. The retro-reflector holder 708 supports a retro-reflector 706 and is capable of translating a variable distance from the side of housing 702 at which the VIPA/lens assembly 703 and the mirror/lens assembly 705 are attached.

In FIGS. 7a–7d, the retro-reflector 706 is illustrated as a right-angle prism, although one of ordinary skill in the art will also readily recognize that the retro-reflector 706 could also comprise a combination of mirrors. Furthermore, in FIGS. 7a–7d, the mirror 354 is illustrated as a flat mirror, although the mirror could also be convex or concave or could have a complex shape in which the curvature varies with position along the mirror.

The translational movement of retro-reflector holder 708 is effected by a mechanism 714 such as a rotating worm gear that receives impetus from a motor 716. Rotation of reflector holder 708 or retro-reflector 706 is prevented during movement by one or more rails or rods along which the reflector holder 708 slides. Two such slider rods 712a–712b are illustrated in FIGS. 7a–7d. A position sensor 718 permits the displacement of the retro-reflector holder 708 to be monitored. An example of a suitable position sensor would be a pair of strip-shaped electrodes comprised of a material of high resistivity and disposed against the inner side of housing 702. With such a position sensor, a mating electrode (not shown) on the retro-reflector holder 708 would form an electrical bridge across the strip electrodes comprising the position sensor 718 and the electrical resistance across the electrodes would thus be related to the position of the holder 708.

Figure 9:
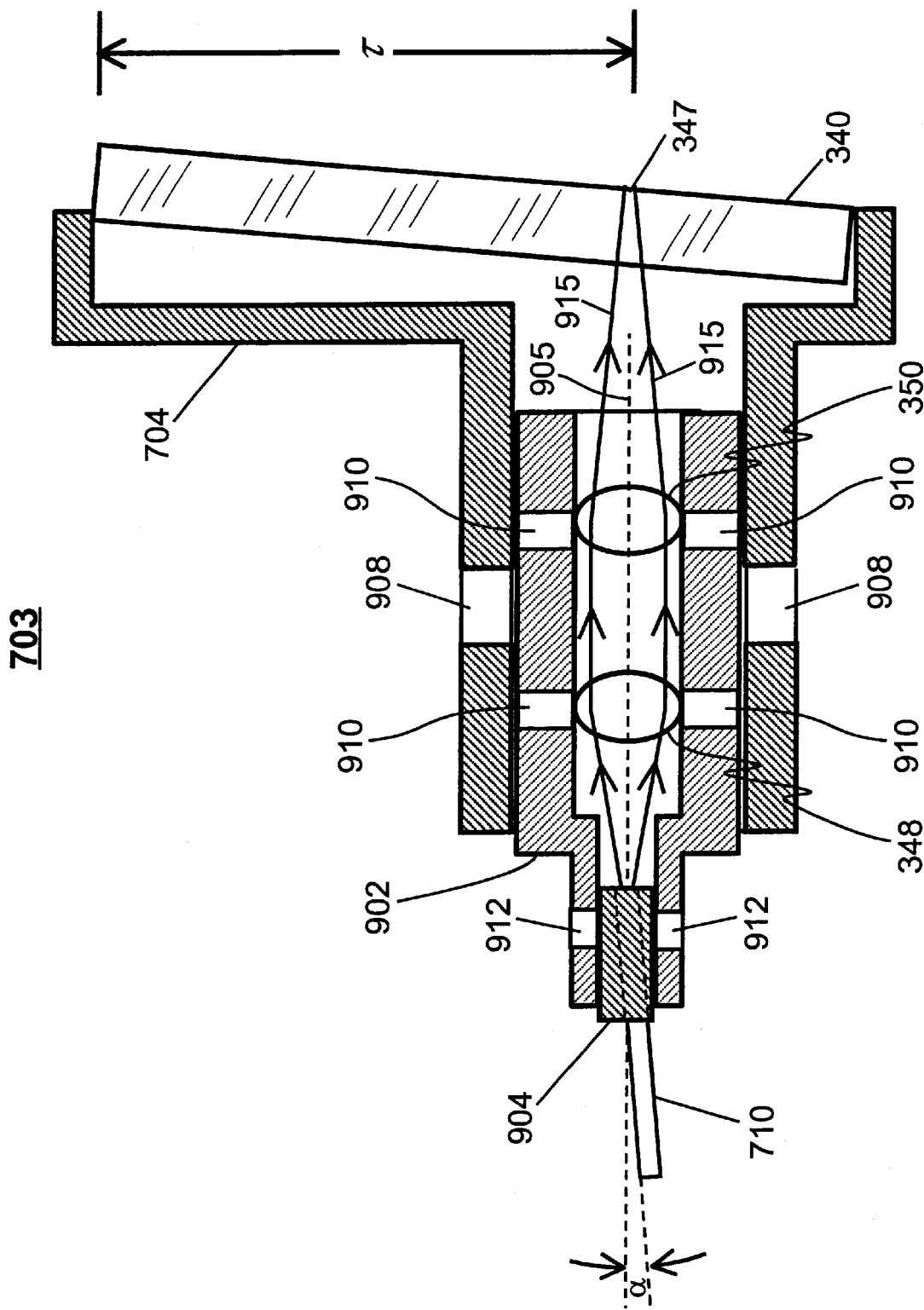
FIG. 9 provides an enlarged view of the VIPA/lens assembly in the first and second preferred embodiment of the tunable chromatic dispersion compensators in accordance with the present invention.

The principles of operation of the tunable dispersion compensator 700 are similar to those illustrated in FIGS. 6a–6b. However, to reduce overall length, the tunable dispersion compensator 700 introduces a folding of the light path between the VIPA 340 and the focusing lens 352. In the apparatus 700, the total light path between the VIPA 340 and the focusing lens 352 comprises the two variable segments 720a–720b plus the fixed-length segment through the retro-reflector 706 plus, possibly, an instrumental constant. The path lengths of segments 720a and 720b are denoted as $L_1$ and $L_2$, respectively and the instrumental constant is denoted as $k_{700}$. Further, the constant optical path length of signal light through the retro-reflector 706 is $2\tau n$, wherein $\tau$ is defined as the clear aperture height of the VIPA 340 as shown in FIG. 9 and n is the refractive index of the material comprising the retro-reflector 706. Thus, the total optical path length L between the VIPA 340 and the focusing lens 352 is given by $L=L_1+L_2+2\tau n+k_{700}$. Letting the length variable x be defined as $x=\max(L_1,L_2)$, then the change in optical path length through the tunable dispersion compensator 700 can be described by a change in x. Therefore, $dL_1=dL_2=dx$ and $dL=(dL_1+dL_2)=2dx$. For the tunable dispersion compensator 700, the minimum possible value, $L_{min}$, of the path length L occurs when $x=L=L_2=0$ and thus $L_{min}=2\tau n+k_{700}$.

Figure 7A:
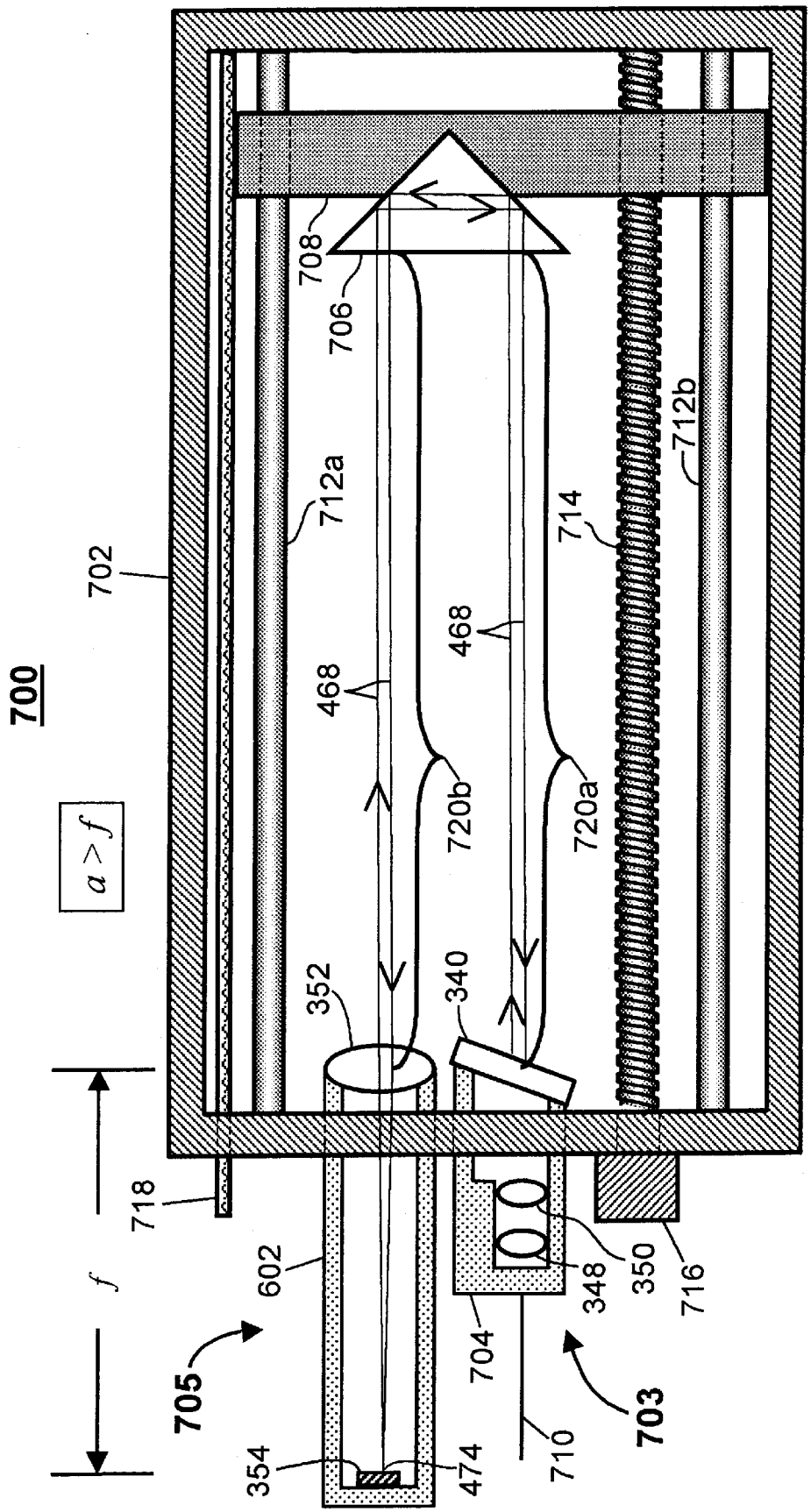
FIGS. 7a–7d illustrate a first preferred embodiment of a tunable chromatic dispersion compensator in accordance with the present invention.
Figure 7B:
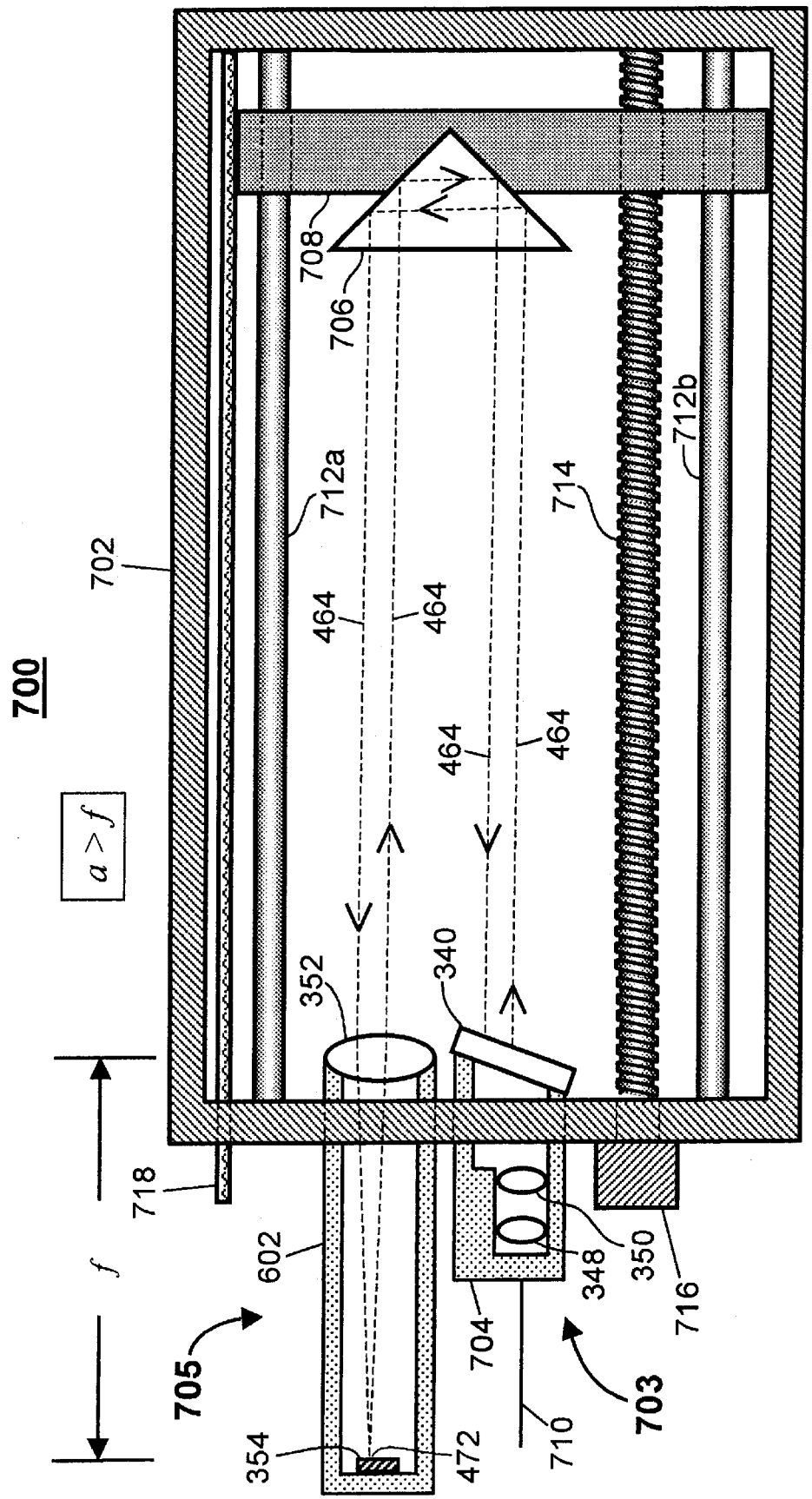
Figure 7C:
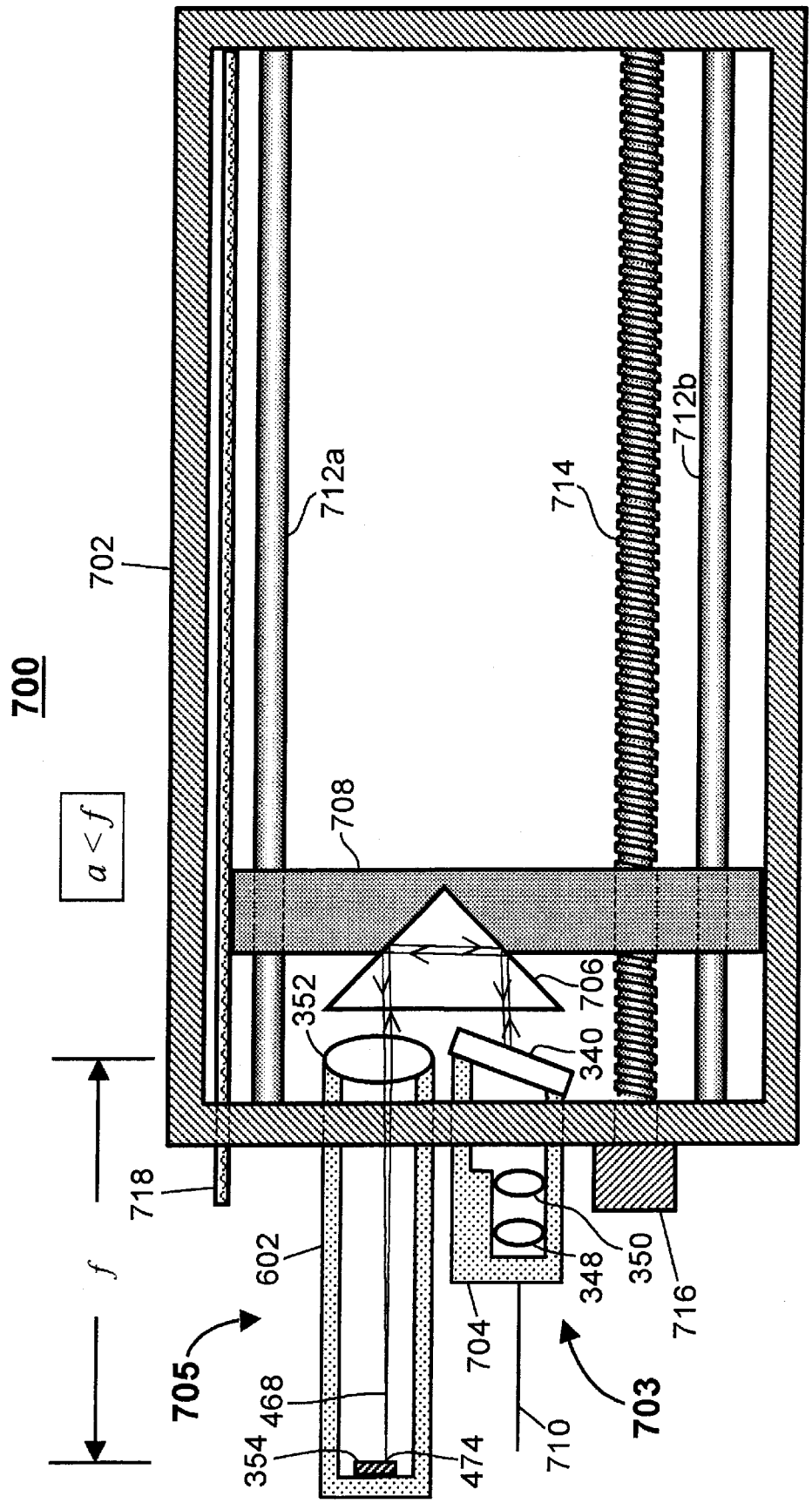
Figure 7D:
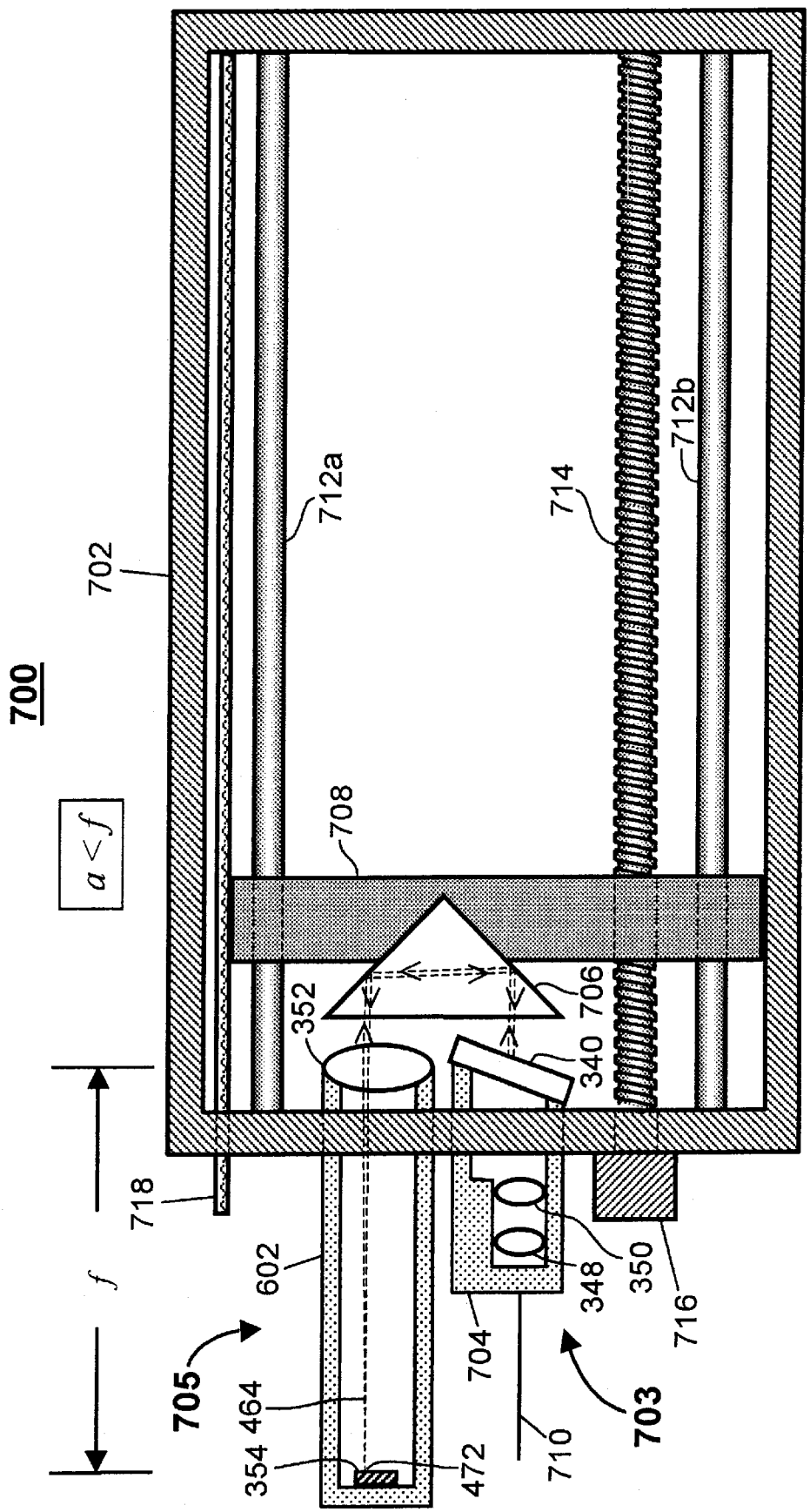

FIGS. 7a–7b respectively illustrate, for the case in which the retro-reflector 706 is disposed such that a>f, the light path of a relatively shorter wavelength light 468 and of a relatively longer wavelength light 464 through the tunable dispersion compensator 700. FIGS. 7c–7d respectively illustrate, for the case in which a<f, the light path of the relatively shorter wavelength light 468 and the relatively longer wavelength 464 through the tunable dispersion compensator 700. A comparison between FIGS. 7a–7b and FIGS. 7c–7d shows that, upon their re-entry into the VIPA 340, the relative positions of the light 464 and the light 468 are reversed relative to each other depending upon whether a>f (FIGS. 7a–7b) or a<f (FIGS. 7c–7d). Thus the tunable dispersion compensator 700 introduces either positive chromatic dispersion or negative chromatic dispersion into the optical signal comprising the lights 464 and 468 depending upon whether a>f (FIGS. 7a–7b) or a<f (FIGS. 7c–7d), respectively.

Figure 8:
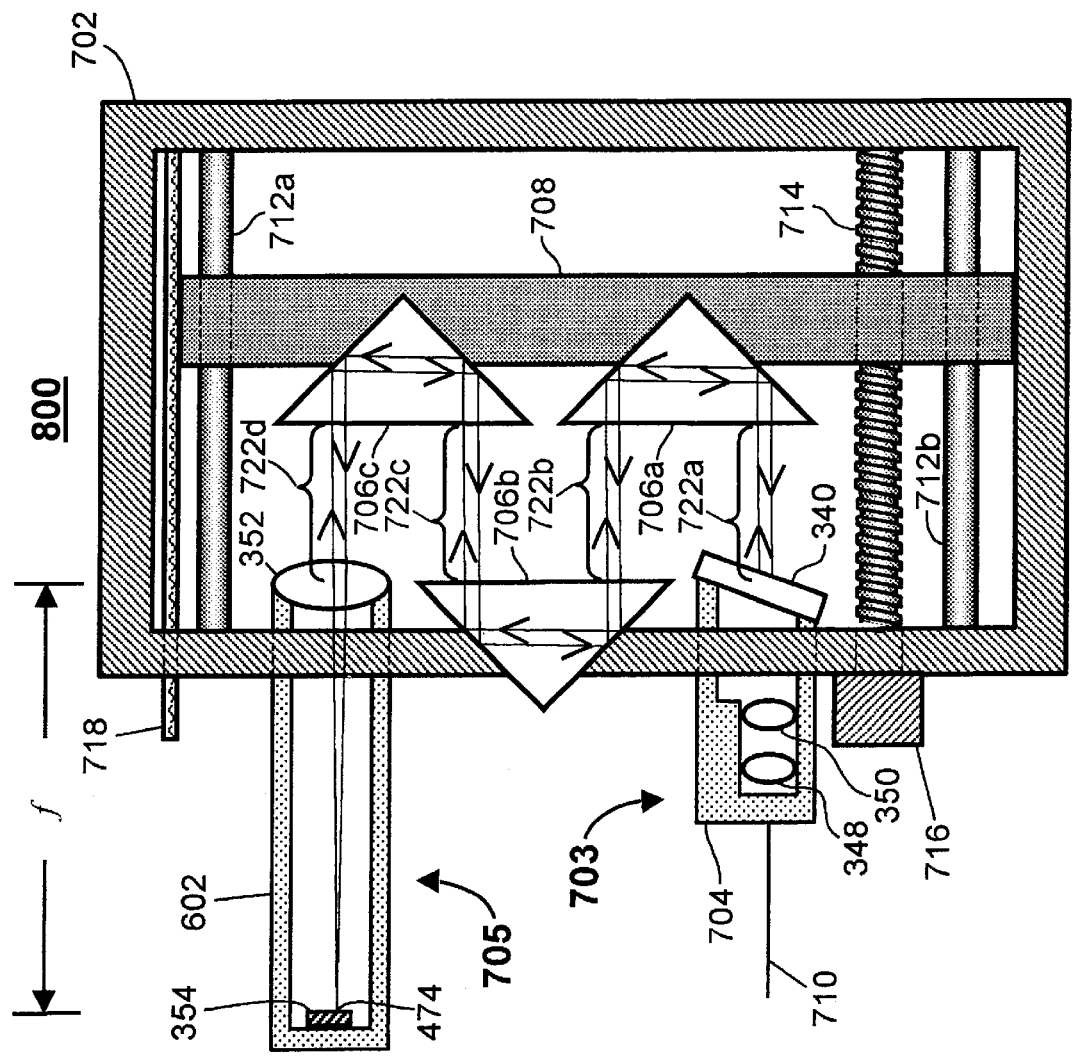
FIG. 8 illustrates a second preferred embodiment of a tunable chromatic dispersion compensator in accordance with the present invention.

FIG. 8 illustrates a second preferred embodiment of a tunable chromatic dispersion compensator in accordance with the present invention. The components of the tunable dispersion compensator 800 (FIG. 8) are identical to those of the tunable dispersion compensator 700 (FIGS. 7a–7d) except that the single retro-reflector 706 of tunable dispersion compensator 700 is replaced by a plurality of retro-reflectors. In tunable dispersion compensator 800, three such retro-reflectors 706a–706c are illustrated. However, the present invention is not limited to any particular number of retro-reflectors. Accordingly, in the tunable dispersion compensator 800, the light paths between the VIPA 340 and the focusing lens 352 are folded backward and forward by a number of times equal to the number of retro-reflectors. At least one member of the set of retro-reflectors is fixed in place relative to the moveable retro-reflector holder 708 and at least one immovable retro-reflector is attached to the housing 702.

In FIG. 8, the retro-reflectors 706a–706c are illustrated as right-angle prisms, although one of ordinary skill in the art will also readily recognize that one or more of the retro-reflectors 706a–706c could comprise a combination of mirrors. Furthermore, in FIG. 8, the mirror 354 is illustrated as a flat mirror, although the mirror 354 could also be convex or concave or could have a complex shape in which the curvature varies with position along the mirror.

The path of light of one particular wavelength through the tunable chromatic dispersion compensator 800 from the VIPA 340 to the mirror 354 and back to the VIPA 340 is illustrated in FIG. 8. Except for the multiple folding of the light paths introduced by the multiplicity of retro-reflectors, the principle of operation of the tunable dispersion compensator 800 is similar to that of the tunable dispersion compensator 700 and is not re-described in detail. The multiple folding of the light paths through the tunable dispersion compensator 800 allows a reduction in size of the tunable dispersion compensator 800 along the dimension parallel to the translational adjustment direction of the retro-reflector holder 708. However the size of the tunable dispersion compensator 800 is increased, relative to the tunable dispersion compensator 700, along a dimension transverse to the translational adjustment direction.

The total light path, of length L, between the VIPA 350 and the focusing lens 352 in the tunable dispersion compensator 800 comprises the four variable segments 722a–722d together with the three fixed-length segments through each of the retro-reflectors 706a–706c plus, possibly, an instrumental constant. The path lengths of segments 722a, 722b, 722c and 722d are denoted as $L_1$, $L_2$, $L_3$ and $L_4$, respectively and the instrumental constant is denoted as $k_{800}$. Further, the constant optical path length through each of the retro-reflectors 706a–706c is $2\tau n$. Thus, in the tunable dispersion compensator 800, $L=L_1+L_2+L_3+L_4+6\tau n+k_{800}$. Letting the length variable x be defined as $x=\max(L_1,L_2,L_3,L_4)$, then $dL_1=dL_2=dL_3=dL_4=dx$ and, therefore $dL=4dx$. In the tunable dispersion compensator 800, the minimum possible value, $L_{min}$, of the path length L is given by $L_{min}=(6\tau n+k_{800})$.

FIG. 9 provides an enlarged view of the VIPA/lens assembly 703 in the first and second preferred embodiment of the tunable chromatic dispersion compensators in accordance with the present invention. The VIPA/lens assembly 703 optically couples the optical fiber 710 to the VIPA 340. The VIPA 340, the fiber 710, the collimating lens 348 and the cylindrical or semi-cylindrical focusing lens 350 are all held rigidly in place and maintained in the proper position relative to one another by the outer housing 704. A lens housing 902, which is disposed within the outer housing 704, contains the collimating lens 348, the cylindrical or semi-cylindrical focusing lens 350 and a fiber holder 904. The fiber holder 904 maintains the fiber 710 rigidly in position at the appropriate distance from the collimating lens 348 and at a slight angle α relative to an imaginary axial line 905 joining the centers of the lenses 348–350.

The lenses 348–350 are rigidly attached to the lens holder 902 by an appropriate cementing material, such as epoxy, applied to the joining holes 910 within the lens holder 902. Likewise, the lens holder 902 is rigidly held in position within the outer housing 704 by an appropriate cementing material, such as solder, applied to the joining holes 908 within the outer housing 704. Similarly, the fiber holder 904 is held rigidly in position at an appropriate distance from the collimating lens 348 within a portion of the lens holder 902 by an appropriate cementing material applied to the joining holes 912 within the lens holder 902.

FIG. 9 also illustrates the pathway of an input light 915 from the fiber 710 and through the lenses 348–350 and to the beam waist 347 within the VIPA 340. The lens holder 902 maintains the cylindrical or semi-cylindrical lens 350 at an appropriate distance from the VIPA 340 such that the beam waist 347 is disposed on the face of the VIPA opposite to the lenses. Similarly, the fiber holder 904 maintains the end of the fiber 710 at an appropriate distance from the collimating lens 348 such that the input light 915 is collimated between the two lenses 348–350. During assembly, the lens holder 902 is translated within the outer housing 704 parallel to the axis 905 such that lens 350 is at the appropriate distance from the VIPA 340. Once this distance is achieved, the lens holder 902 is secured to the outer housing 704 by a cementing material applied to the joining holes 908. Similarly, the fiber holder 904 is translated parallel to the axis 905 within the lens holder 902 during assembly such that the end of the fiber is at the appropriate distance from the collimating lens 348. Once this distance is achieved, the fiber holder 904 is secured to the lens holder 902 by cementing material applied to the joining holes 912.

Figure 10:
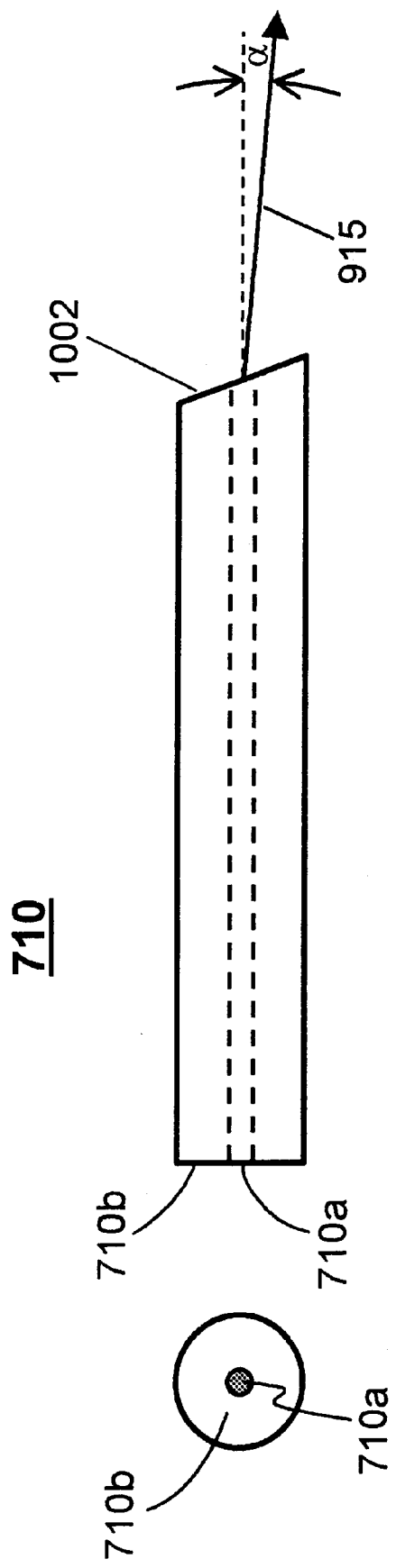
FIG. 10 illustrates an enlarged view of the fiber in the first and second preferred embodiments of the tunable chromatic dispersion compensators in accordance with the present invention.

FIG. 10 illustrates an enlarged view of the fiber 710 in the first and second preferred embodiments of the tunable chromatic dispersion compensators in accordance with the present invention. As shown in the cross sectional view on the left side of FIG. 10, the fiber 710 comprises a light-carrying core 710a surrounded by a cladding 710b. The end face 1002 of the fiber 710 is disposed towards the collimating lens 348 and is polished at an angle to prevent unwanted reflections from propagating in the same direction as signal lights. Because of refraction, the input light 915 exits from the fiber 710 at a small angle a relative to the long dimension of the fiber. To compensate for this angle, the hollow bore of the fiber holder 904 is likewise cut at the same angle a relative to the axis 905, as shown in FIG. 9. Therefore, the input light 915 is properly collimated parallel to the axis 905 after passing through the collimating lens 348.

In both the tunable dispersion compensator 700 (FIGS. 7a–7d) and the tunable dispersion compensator 800 (FIG. 8), a length dimension is reduced, relative to the prior-art apparatus illustrated in FIGS. 6a–6b, by folding of the beam path parallel to itself. However, the overall volume is not reduced, relative to the prior-art tunable dispersion compensator. FIGS. 11a–11c and FIG. 12 illustrate, respectively, a third and a fourth preferred embodiments of the tunable chromatic dispersion compensator in accordance with the present invention, in which volume may be reduced by crossing of the beam path back upon itself a plurality of times.

In the tunable dispersion compensator 1100 (FIGS. 11a–11c), the VIPA/lens assembly 703 and the mirror/lens assembly 705 are common to the previous embodiments of the present invention. As in the previously described embodiments of the present invention, the VIPA assembly comprises a VIPA 340, a collimating lens 348, a cylindrical or semi-cylindrical lens 350 and a housing. Further, as in the previously described embodiments of the present invention, the mirror/lens assembly 705 comprises a mirror 354, a focusing lens 352 and a mirror and lens holder 602. However, in contrast to the previously described embodiments of the present invention, the VIPA assembly 703 and the mirror assembly 705 are disposed at an angle of $2\beta$ relative to one another and are each disposed at an angle of $\beta$ relative to an axis 1101 (FIG. 11a).

Figure 11A:
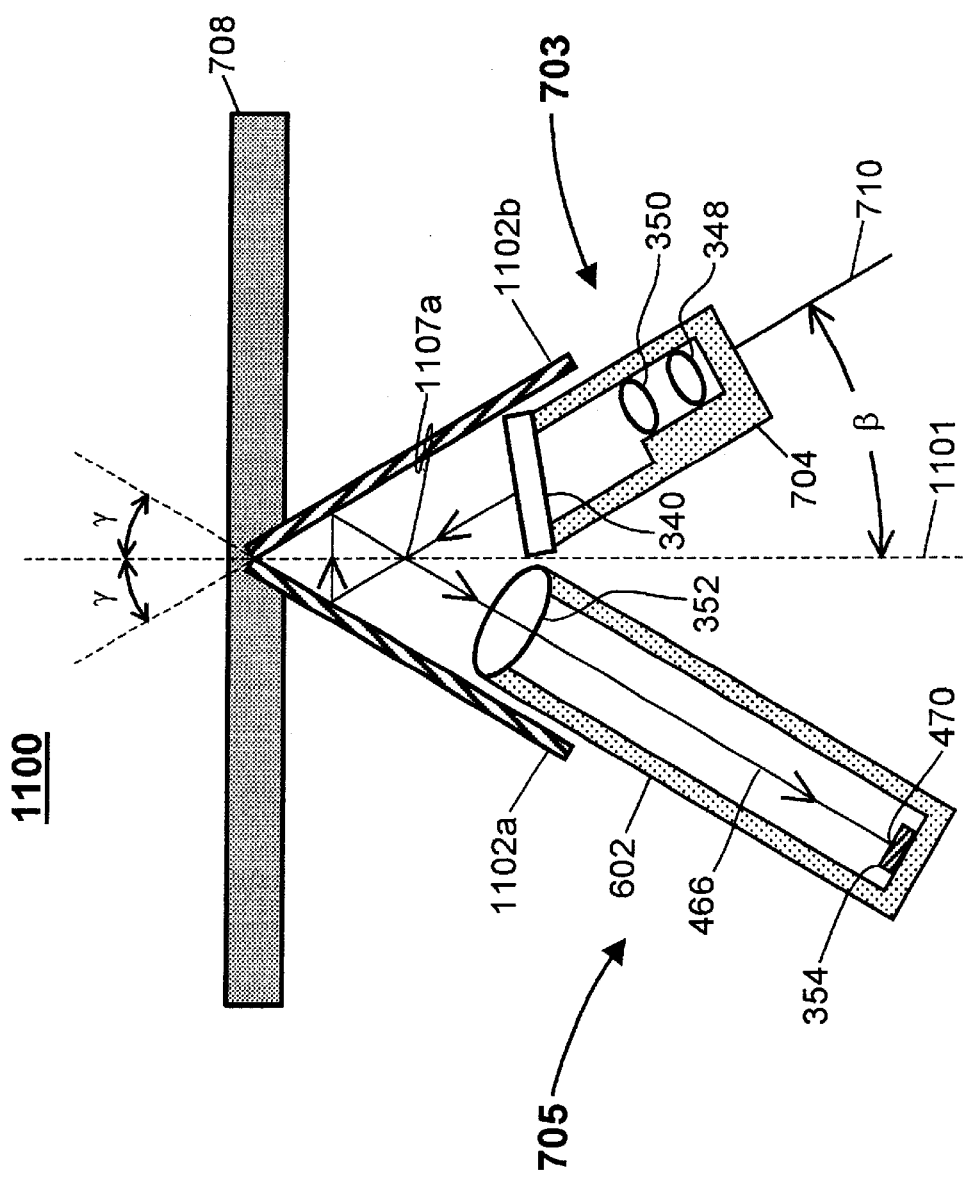
FIGS. 11a–11c illustrate a third preferred embodiment of the tunable chromatic dispersion compensator in accordance with the present invention.

Further, in the tunable chromatic dispersion compensator 1100, two flat reflective surfaces 1102a–1102b are each disposed at an angle of $\gamma$ to the axis 1101 (FIG. 11a). The reflective surfaces 1102a–1102b preferably comprise mirrors, but might also comprise reflective coatings disposed on two faces of a single glass prism. The angle $\gamma$ is given by the relation $$\gamma = \frac{\pi}{4} - \frac{1}{2}\sin^{-1}\left(\frac{\sin\beta}{n}\right)$$

in which n is the refractive index of the material disposed between the surfaces 1102a–1102b. The reflective surfaces 1102a–1102b replace the retro-reflectors 706, 706a–706c of previous embodiments of the present invention and, similarly to those retro-reflectors, serve to fold the paths of light rays between the VIPA 340 and the focusing lens 352. In the preferred tunable chromatic dispersion compensator embodiment 1100 (FIGS. 11a–11b), the material disposed between the surfaces 1102a–1102b is air, with a refractive index, n, of unity, $\beta=\pi/6$ (30°) and $\gamma=\pi/6$ (30°).

Figure 11B:
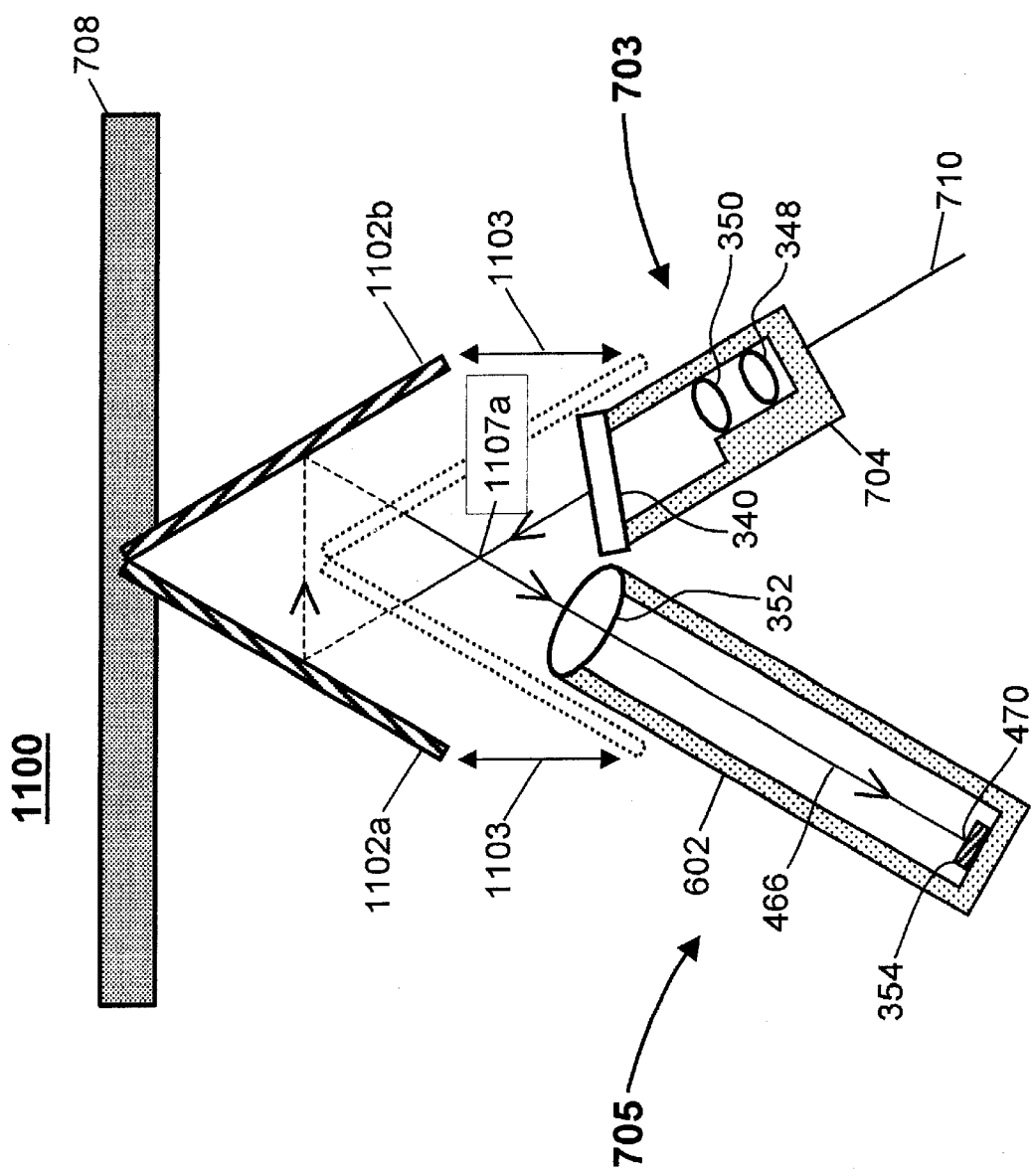

In the tunable dispersion compensator 1100, the reflective surfaces 1102a–1102b are attached to and move (or are translated) together with the movable reflector holder 708 along the adjustment direction 1103 which is parallel to the axis 1101 (FIG. 11b). There should be no rotation of either of the reflective surfaces 1102a–1102b during such movement or translation. Accordingly, the pathway of a center wavelength 466 of an optical signal through the compensator 1100 for two different positions of the reflective surfaces 1102a–1102b is illustrated in FIGS. 11a–11b, respectively.

Figure 11C:
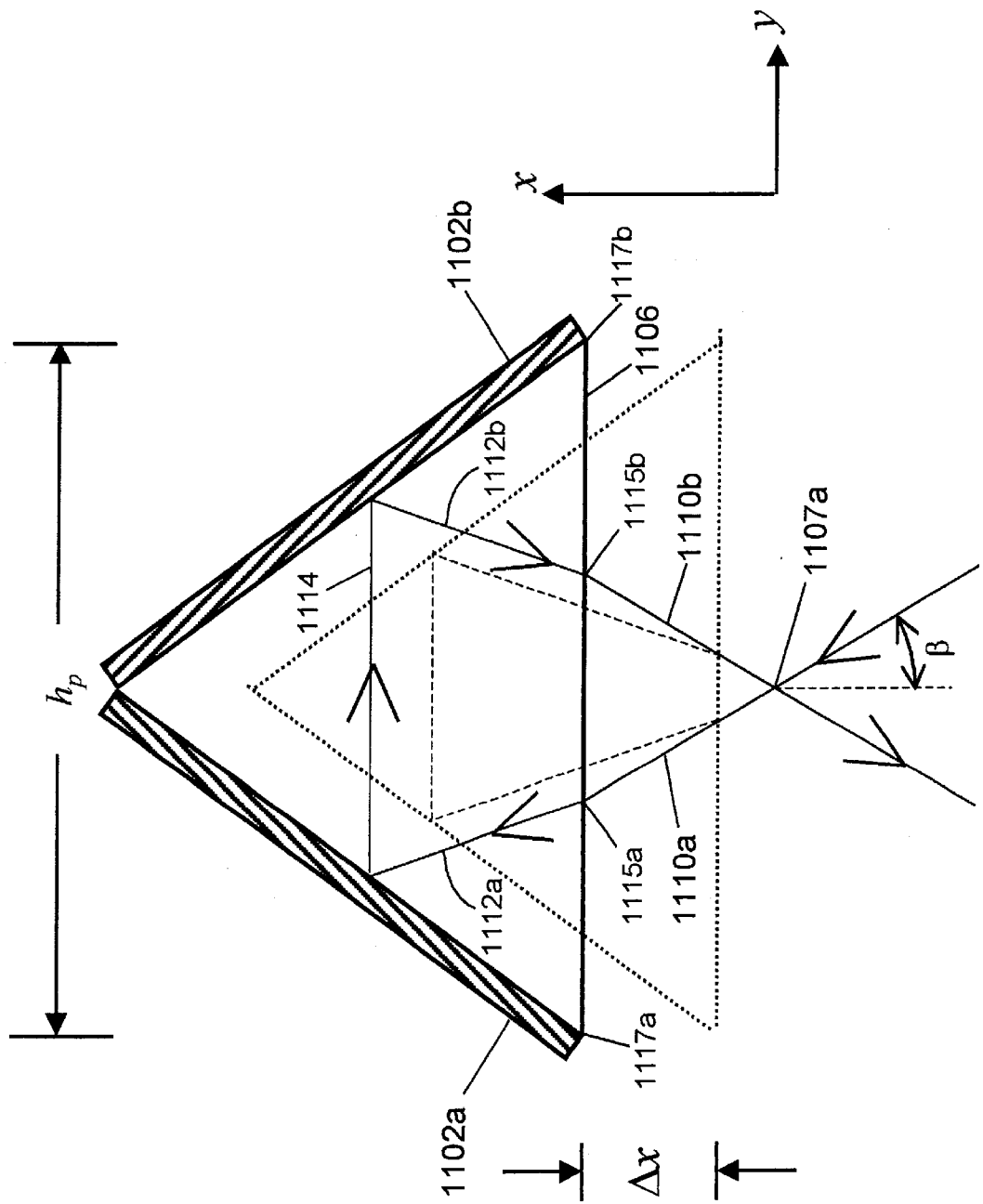
Figure 12:
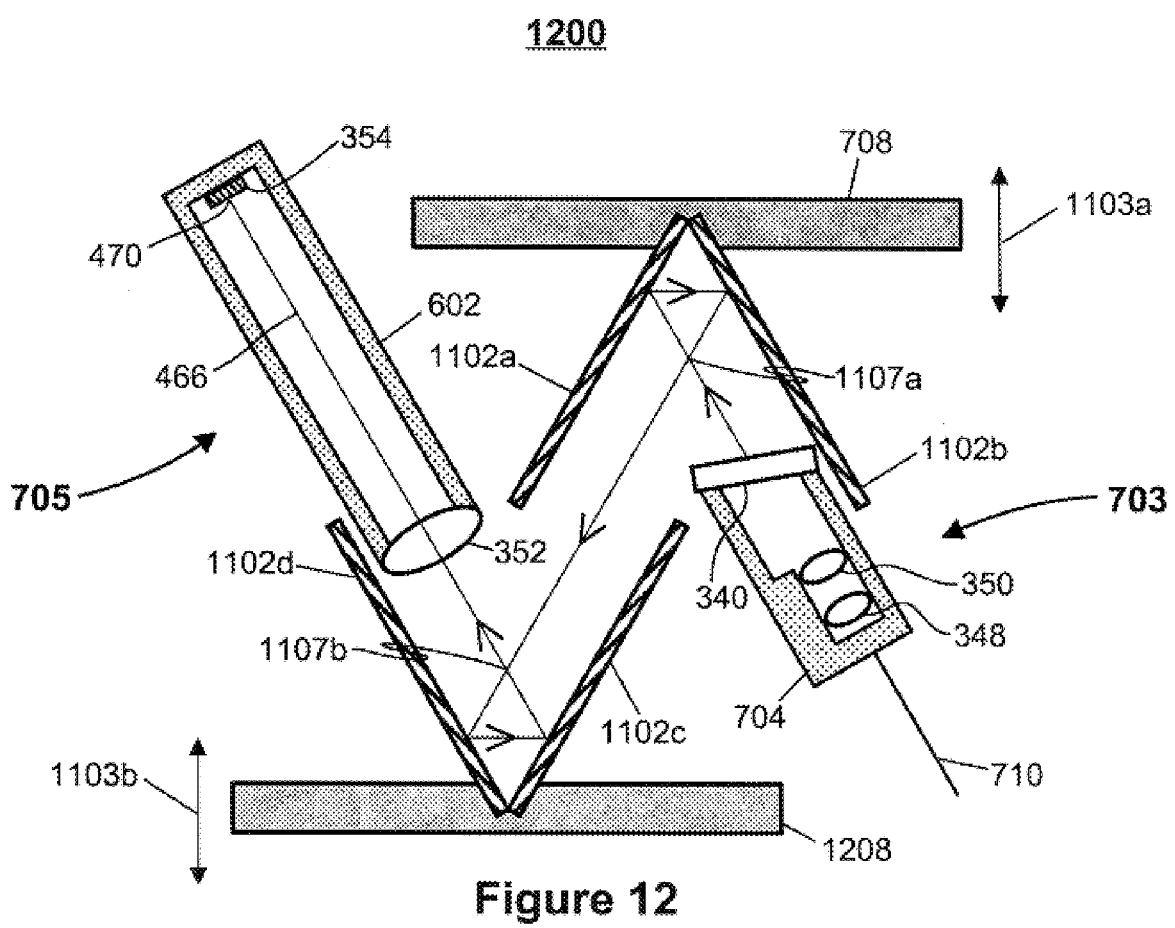
FIG. 12 illustrates a fourth preferred embodiment of the tunable chromatic dispersion compensator in accordance with the present invention.

FIG. 11c illustrates a second example of the path of light comprising a "center wavelength" through the third preferred embodiment of the tunable chromatic dispersion compensator in accordance with the present invention. In the example of the tunable dispersion compensator 1100, the material that is disposed between the surfaces 1102a–1102b comprises a prism 1106 having a constant refractive index n that is greater than unity. The prism 1106 differs from a retro-reflector, such as the retro-reflectors 706, 706a–706c because the two reflective surfaces 1102a–1102b are not disposed at a right angle to one another. For comparison purposes, FIG. 11c also illustrates, with dashed lines, the path of the light when the reflective surfaces 1102a–1102b and the prism 1106 are translated by a distance of $\Delta x$ parallel to the x-axis.

During the translation of the reflective surfaces 1102a–1102b and the prism 1106 by the distance $\Delta x$ (FIG. 11c), there is a change in the length of each of the two path segments 1110a–1110b, of each of the two path segments 1112a–1112b and of the path segment 1114. The path length of each of the segments 1110a–1110b is denoted as $L_1$, the path length of each of the segments 1112a–1112b is denoted as $L_2$. The respective changes in length of these path segments are denoted as $\Delta L_1$, $\Delta L_2$ and $\Delta L_3$. Despite these length changes, the positions and directions of the portions of the pathway of the center wavelength that are external to the prism 1106 do not change during translation of the prism and the reflective surfaces 1102a–1102b. The total change in length $\Delta L$ of the pathway of the center wavelength caused by translation of the reflective surfaces 1102a–1102b by $\Delta x$ is given by $\Delta L = \Delta L_1 + \Delta L_2 + \Delta L_3$. In the limit of infinitesimal $\Delta x$, the ratio $\Delta L/\Delta x$ approaches the limit given by the derivative $dL/dx$. The value of $dL/dx$ varies with the input angle $\beta$ and with the refractive index n. For reasonable choices of the parameters $\beta$ and n, the general range of $dL/dx$ is given by the relation $1.90 \leq dL/dx \leq 2.10$.

In contrast to the tunable dispersion compensator 700 (FIGS. 7a–7d) and the tunable dispersion compensator 800 (FIG. 8), the tunable dispersion compensator 1100 (FIGS. 11a–11c) exhibits an effective maximum path length $L_{max}$ between the VIPA 340 and the focusing lens 352. This maximum path length occurs at such a distance $x_{max}$ when the points of entry and exit 1115a–1115b into the prism converge with the prism corners 1117a–1117b. Specifically, if the origin of the x-axis is taken at the cross-over point 1107a, the $x_{max}$ τ is given by the relation $$x_{\max} = \frac{h_p}{2\tan\beta},$$

wherein the quantity $h_p$ is the clear-aperture height of the prism 1106 as shown in FIG. 11c.

In the tunable dispersion compensator 1200 (FIG. 12), the VIPA/lens assembly 703, the mirror/lens assembly 705, the reflective surfaces 1102a–1102b and the moveable reflector holder 708 are common to the tunable dispersion compensator 1100 (FIGS. 11a–11c). As in the previously described embodiments of the present invention, the VIPA/lens assembly 703 comprises a VIPA 340, a collimating lens 348, a cylindrical or semi-cylindrical lens 350 and a housing 704 and the mirror/lens assembly 705 comprises a mirror 354, a focusing lens 352 and a mirror and lens holder 602. However, in contrast to the configuration of the tunable dispersion compensator 1100, the VIPA assembly and the mirror assembly are parallel to one another and additional set of reflective surfaces 1102c–1102d, both attached to an additional moveable reflector holder 1208, are disposed within the optical pathway. The additional set of reflective surfaces 1102c–1102d comprising the tunable dispersion compensator 1200 produces a second cross-over point 1107b of the light path of signal rays traveling through the compensator 1200. Either or both of the set of reflective surfaces 1102a–1102b or the set of reflective surfaces 1102a–1102b may be translated parallel to the adjustment direction 1103a or adjustment direction 1103b, respectively, to change the total light path length between the VIPA 340 and the focusing lens 352.

One of ordinary skill in the art will readily recognize that further reflective surfaces or reflectors could be added to either the tunable dispersion compensator 1100 or the tunable dispersion compensator 1200 so as to produce additional folding(s) of the beam path. Such additional reflective surfaces or reflectors could, for instance, be disposed between the light cross-over point 1107a and either the VIPA/lens assembly 703 or the mirror/lens assembly 705 in the compensator 1100. In this case, the additional reflective surfaces or reflectors could be utilized to reduce the physical angle between the VIPA/lens assembly 703 or the mirror/lens assembly 705 while maintaining the angle β at the cross-over point 1107a. Further, the additional reflective surfaces or reflectors could be disposed between the two light cross-over points 1107a–1107b in the compensator 1200 so as to create additional light path cross-over points to as to produce further volume reduction. The folded beam path need not be confined to a single plane, as illustrated in the preferred embodiments of the present invention, but might be disposed in a complex fashion in three dimensions.

An improved tunable chromatic dispersion compensator has been disclosed. The preferred embodiments of the tunable chromatic dispersion compensator in accordance with the present invention uses a Virtually Imaged Phased Array (VIPA) to produce a controlled variable degree of chromatic dispersion to a plurality of optical channels so as to compensate for unwanted chromatic dispersion in an optical communications system. The compensator in accordance with the present invention comprises a main housing to which a VIPA and lens assembly and a lens and mirror assembly are rigidly attached and within which at least one moveable retro-reflector, a translation mechanism and a position sensor are housed. The VIPA and lens assembly comprises an optical fiber, a collimating lens, a cylindrical focusing lens and a VIPA together with various holders that enable the positions of the fiber, the lenses and the VIPA to be positioned and joined in place with respect to one another. The lens and mirror assembly comprises a focusing lens, a mirror and a holder. Positional adjustment of the moveable retro-reflectors permits variable control of the optical path length between the VIPA and the focusing lens. This variable change in optical path length permits variable control of the magnitude and sign of chromatic dispersion provided by the tunable dispersion compensator. The position sensor permits monitoring of the variable chromatic dispersion.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A tunable chromatic dispersion compensator, comprising:
   a virtually imaged phased array (VIPA);
   at least one reflector optically coupled to the VIPA;
   a mirror optically coupled to the at least one reflector; and
   a movable reflector holder coupled to the at least one reflector, wherein the movable reflector holder moves the at least one reflector such that a length of a beam path between the VIPA and the at least one reflector and between the mirror and the at least one reflector is variable.

2. The compensator of claim 1, wherein the VIPA spatially separates a plurality of wavelengths in a composite optical signal.

3. The compensator of claim 1, wherein the at least one reflector comprises a right-angle prism.

4. The compensator of claim 1, wherein the at least one reflector comprises a plurality of mirrors.

5. The compensator of claim 1, wherein the at least one reflector comprises a mirror with a variable curvature.

6. The compensator of claim 1, wherein the at least one reflector comprises:
   a first retro-reflector optically coupled to the VIPA;
   a second retro-reflector optically coupled to the first retro-reflector; and
   a third retro-reflector optically coupled to the second retro-reflector and the mirror, wherein a length of a beam path between the VIPA and the first retro-reflector, a length of a beam path between the second and the third retro-reflectors, and a length of a beam path between the third retro-reflector and the mirror are variable.

7. The compensator of claim 1, wherein the at least one reflector comprises:
   a first reflective surface optically coupled to the VIPA;
   a second reflective surface optically coupled to the first reflective surface and the mirror, wherein a length of a beam path between the first reflective surface and the VIPA and a length of a beam path between the second reflective surface and the mirror are variable.

8. The compensator of claim 7, wherein the at least one reflector further comprises:
   a prism optically coupled to the first and second reflective surfaces, the VIPA, and the mirror, wherein a refractive index of the prism is greater than unity.

9. The compensator of claim 1, wherein the at least one reflector comprises:
   a first reflective surface optically coupled to the VIPA;
   a second reflective surface optically coupled to the first reflective surface;
   a third reflective surface optically coupled to the second reflective surface; and
   a fourth reflective surface optically coupled to the third reflective surface and the mirror, wherein a length of a beam path between the VIPA and the first reflective surface, a length of a beam path between the second reflective surface and the third reflective surface, and a length of a beam path between the fourth reflective surface and the mirror are variable.

10. The compensator of claim 1, wherein the mirror is a flat mirror.

11. The compensator of claim 1, wherein the mirror is a concave mirror.

12. The compensator of claim 1, wherein the mirror is a convex mirror.

13. The compensator of claim 1, further comprising:
   a first holder coupled to an outer housing, wherein the first holder supports the VIPA, a first focusing lens optically coupled to the VIPA, and a collimating lens optically coupled to the first focusing lens.

14. The compensator of claim 13, wherein the first holder comprises:
an optical fiber holder for holding an optical fiber at an appropriate distance from the collimating and the first focusing lenses, and at an appropriate angle to an axial line joining centers of the collimating and first focusing lenses.

15. The compensator of claim 14, wherein the first holder further comprises:
a plurality of joining holes within which a cementing material may be deposited, wherein the cementing material assists in rigidly holding the fiber holder, the collimating lens, and the first focusing lens at appropriate positions within the first holder.

16. The compensator of claim 13, further comprising:
a second holder coupled to an outer housing, wherein the second holder supports the mirror and a second focusing lens optically coupled to the mirror and the at least one reflector.

17. The compensator of claim 1, further comprising:
at least one slider rod coupled to an outer housing and to the movable reflector holder, wherein the movable reflector holder slides along the at least one slider rod;
a mechanism coupled to the movable reflector holder for moving the movable reflector holder along the at least one slider rod; and
a position sensor coupled to the outer housing for monitoring a location of the at least one reflector.

18. A tunable chromatic dispersion compensator, comprising:
a VIPA;
a first retro-reflector optically coupled to the VIPA;
a second retro-reflector optically coupled to the first retro-reflector;
a third retro-reflector optically coupled to the second retro-reflector;
a mirror optically coupled to the third retro-reflector; and
a movable reflector holder coupled to the first and third retro-reflectors, wherein a length of a beam path between the VIPA and the first retro-reflector, a length of a beam path between the second and the third retro-reflectors, and a length of a beam path between the third retro-reflector and the mirror are variable.

19. A tunable chromatic dispersion compensator, comprising:
a VIPA;
a first reflective surface optically coupled to the VIPA;
a second reflective surface optically coupled to the first reflective surface;
a mirror optically coupled to the second reflective surface; and
a movable reflector holder coupled to the first and second reflective surfaces, wherein a length of a beam path between the first reflective surface and the VIPA and a length of a beam path between the second reflective surface and the mirror are variable.

20. A tunable chromatic dispersion compensator, comprising:
a VIPA;
a first reflective surface optically coupled to the VIPA;
a second reflective surface optically coupled to the first reflective surface;
a third reflective surface optically coupled to the second reflective surface;
a fourth reflective surface optically coupled to the third reflective surface;
a mirror optically coupled to the fourth reflective surface;
a first movable reflector holder coupled to the first and second reflective surfaces; and
a second movable reflector holder coupled to the third and fourth reflective surfaces, wherein a length of a beam path between the VIPA and the first reflective surface, a length of a beam path between the second reflective surface and the third reflective surface, and a length of a beam path between the fourth reflective surface and the mirror are variable.

21. A method for compensating for chromatic dispersion, comprising the steps of:
(a) spatially separating a plurality of wavelengths in a composite optical signal utilizing a VIPA;
(b) folding a beam path of the spatially separated plurality of wavelengths utilizing at least one reflector;
(c) reflecting the spatially separated plurality of wavelengths back to the at least one reflector utilizing a mirror;
(d) folding a path of the reflected spatially separated plurality of wavelengths utilizing the at least one reflector; and
(e) transmitting the spatially separated plurality of wavelengths to the VIPA, wherein a length of a beam path between the VIPA and the at least one reflector and a length of a beam path between the at least one reflector and the mirror are variable.

22. A system for compensating for chromatic dispersion, comprising:
means for spatially separating a plurality of wavelengths in a composite optical signal utilizing a VIPA;
means for folding a beam path of the spatially separated plurality of wavelengths utilizing at least one reflector;
means for reflecting the spatially separated plurality of wavelengths back to the at least one reflector utilizing a mirror;
means for folding a path of the spatially separated plurality of wavelengths utilizing the at least one reflector; and
means for transmitting the spatially separated plurality of wavelengths to the VIPA, wherein a length of a beam path between the VIPA and the at least one reflector and a length of a beam path between the at least one reflector and the mirror are variable.

* * * * *